United States Patent
Minemura et al.

(10) Patent No.: US 9,078,021 B2
(45) Date of Patent: Jul. 7, 2015

(54) INFORMATION PROCESSING APPARATUS, CONTENT TRANSMISSION METHOD AND STORAGE MEDIUM

(71) Applicant: Kabushiki Kaisha Toshiba, Tokyo (JP)

(72) Inventors: Takashi Minemura, Ome (JP); Noriyuki Hirayama, Fuchu (JP)

(73) Assignee: Kabushiki Kaisha Toshiba

( * ) Notice: Subject to any disclaimer, the term of this patent is extended or adjusted under 35 U.S.C. 154(b) by 0 days.

(21) Appl. No.: 14/011,613

(22) Filed: Aug. 27, 2013

(65) Prior Publication Data

US 2014/0201776 A1    Jul. 17, 2014

Related U.S. Application Data

(63) Continuation of application No. PCT/JP2013/058160, filed on Mar. 21, 2013.

(30) Foreign Application Priority Data

Jan. 16, 2013   (JP) .................................. 2013-005403

(51) Int. Cl.
   *H04N 21/254*   (2011.01)
   *H04N 21/436*   (2011.01)
   *H04N 21/462*   (2011.01)
   *H04N 21/4627*  (2011.01)
   *H04N 21/835*   (2011.01)

(52) U.S. Cl.
   CPC ..... *H04N 21/2541* (2013.01); *H04N 21/43615* (2013.01); *H04N 21/4622* (2013.01); *H04N 21/4627* (2013.01); *H04N 21/835* (2013.01)

(58) Field of Classification Search
   None
   See application file for complete search history.

(56) References Cited

U.S. PATENT DOCUMENTS

| 7,580,612 | B2 | 8/2009 | Sato et al. |
| 2002/0051581 | A1 | 5/2002 | Takeuchi et al. |
| 2005/0094809 | A1* | 5/2005 | Pedlow et al. ................ 380/200 |

(Continued)

FOREIGN PATENT DOCUMENTS

| JP | 2002-010251 | 1/2002 |
| JP | 2006-115264 | 4/2006 |
| JP | 2006-229660 | 8/2006 |
| JP | 2007-088802 | 4/2007 |
| JP | 2012-074771 | 4/2012 |

OTHER PUBLICATIONS

International Search Report from corresponding PCT/JP2013/058160 application mailed Apr. 23, 2013.
English Translation of International Search Report from corresponding PCT/JP2013/058160 application mailed Apr. 23, 2013.

*Primary Examiner* — Nasser Goodarzi
*Assistant Examiner* — Terrika Peterson
(74) *Attorney, Agent, or Firm* — Blakely Sokoloff Taylor & Zafman LLP

(57) ABSTRACT

According to one embodiment, an information processing apparatus includes a first input module, a second input module, a converter and an output module. The first input module receives a first packet group of first content applied to a first copyright protection method. The second input module receives a second packet group of second content applied to a second copyright protection method. The converter re-packetizes the first content packetized into the first packet group and the second content packetized into the second packet group, into a third packet group for outputting to a transmission path by applying a third copyright protection method. The output module outputs the third packet group of the first content and the second content.

11 Claims, 19 Drawing Sheets

(56) References Cited

U.S. PATENT DOCUMENTS

| | | |
|---|---|---|
| 2006/0193524 A1 | 8/2006 | Tarumoto et al. |
| 2007/0156603 A1* | 7/2007 | Yoon et al. .................... 705/59 |
| 2008/0159532 A1* | 7/2008 | Verma ........................... 380/210 |
| 2010/0002130 A1* | 1/2010 | Kamio ........................... 348/441 |
| 2010/0211672 A1* | 8/2010 | Brown et al. ................. 709/224 |
| 2011/0316990 A1* | 12/2011 | Saito et al. ..................... 348/51 |
| 2012/0079551 A1 | 3/2012 | Isozaki et al. |

* cited by examiner

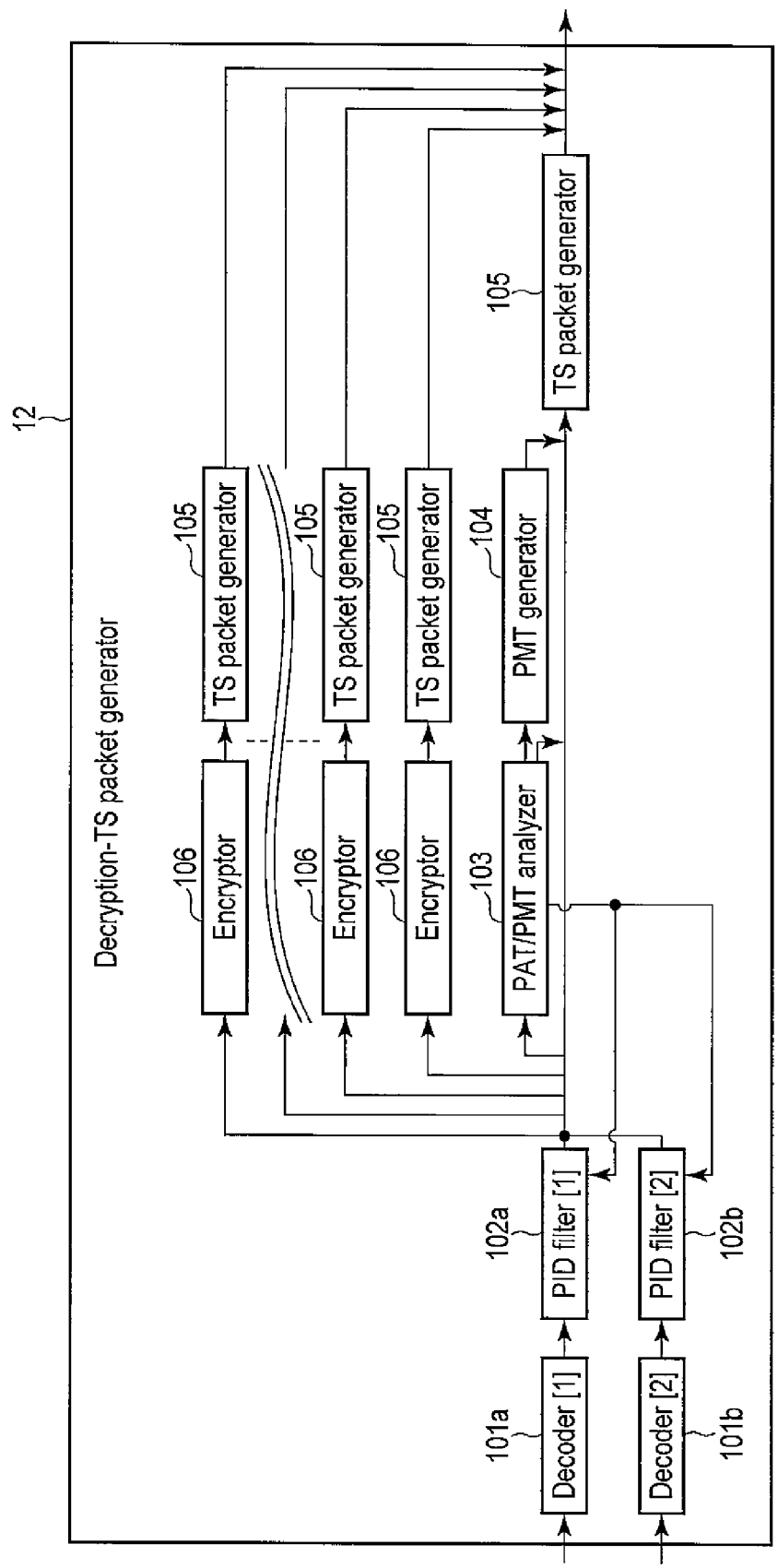
F I G. 5

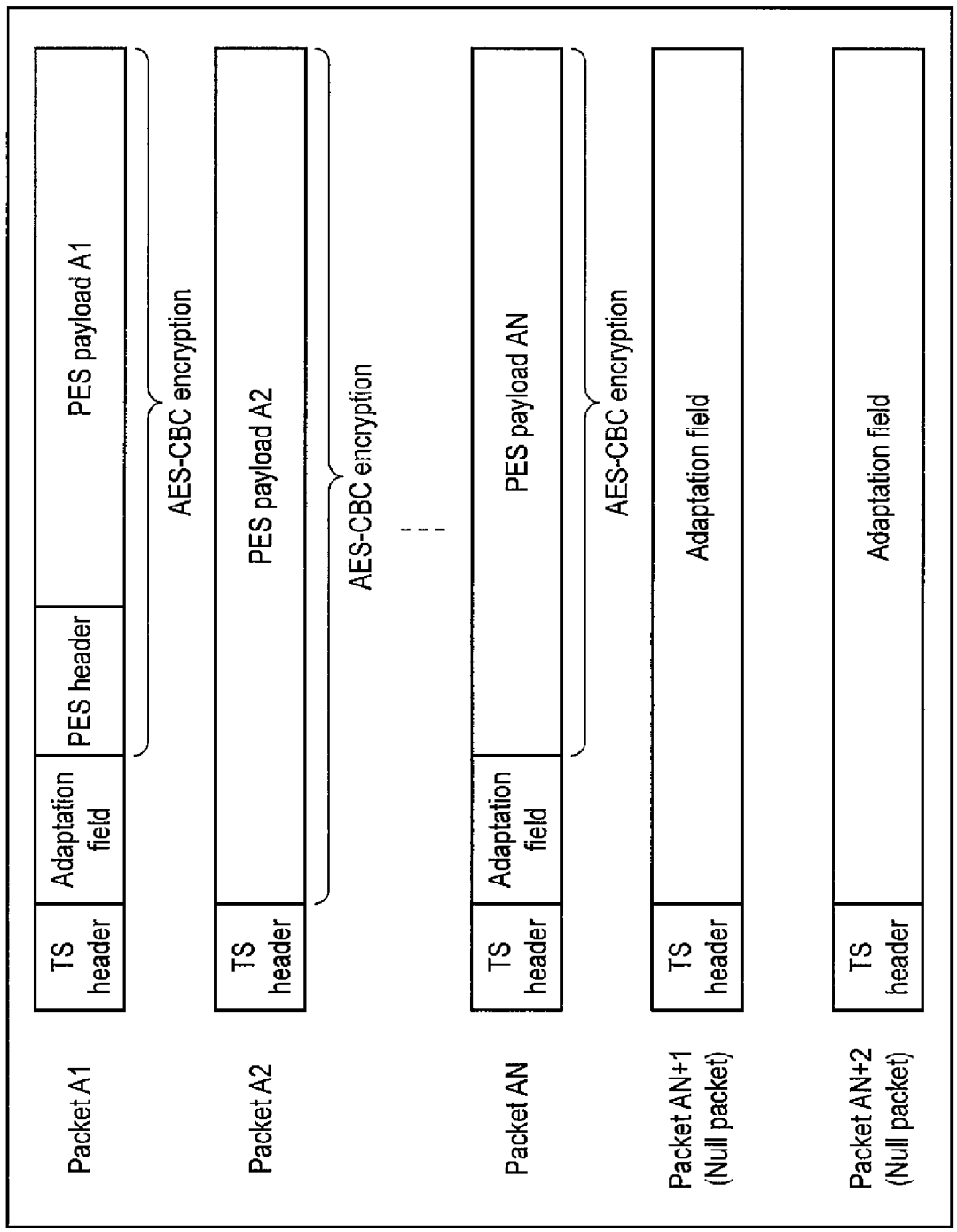
F I G. 6

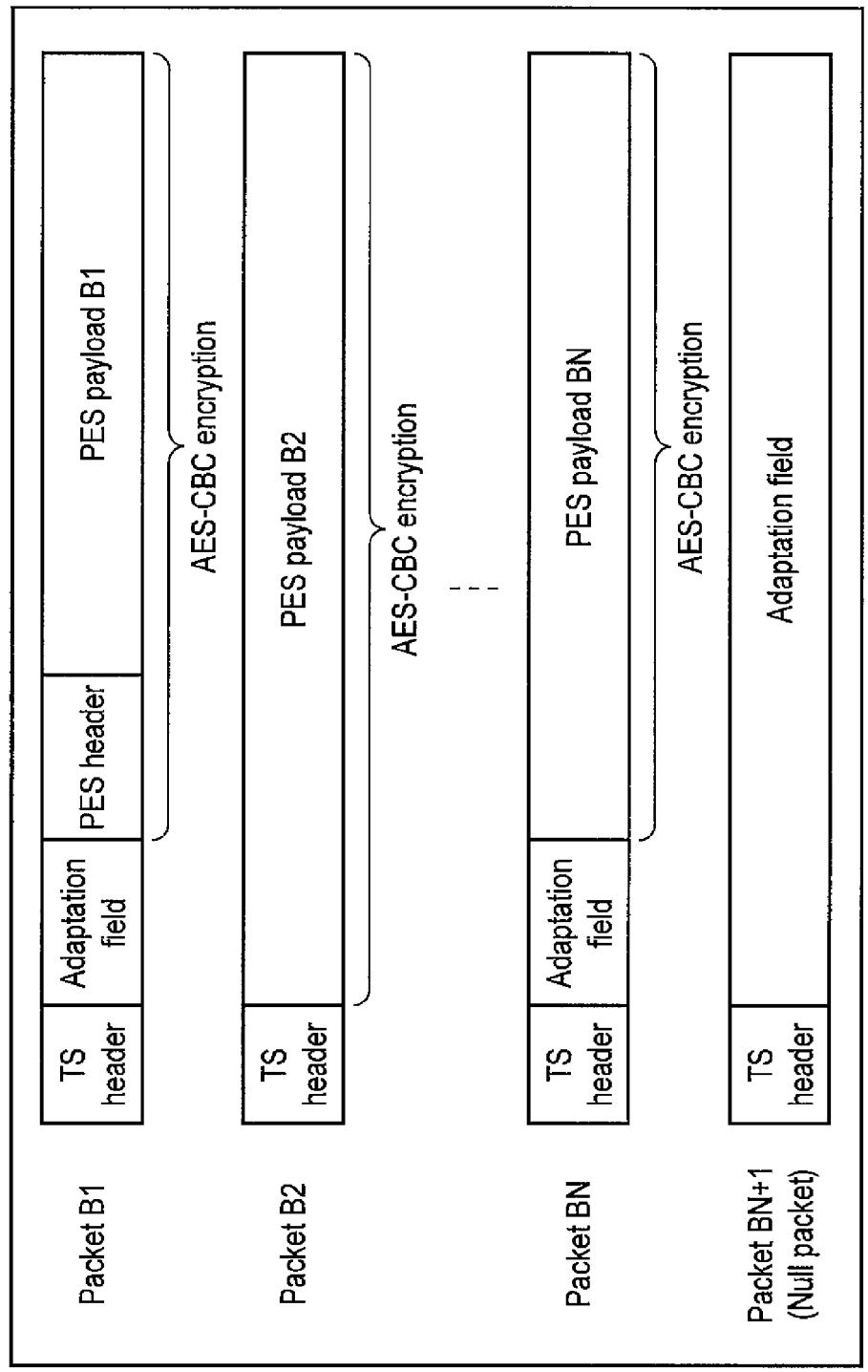
F I G. 7

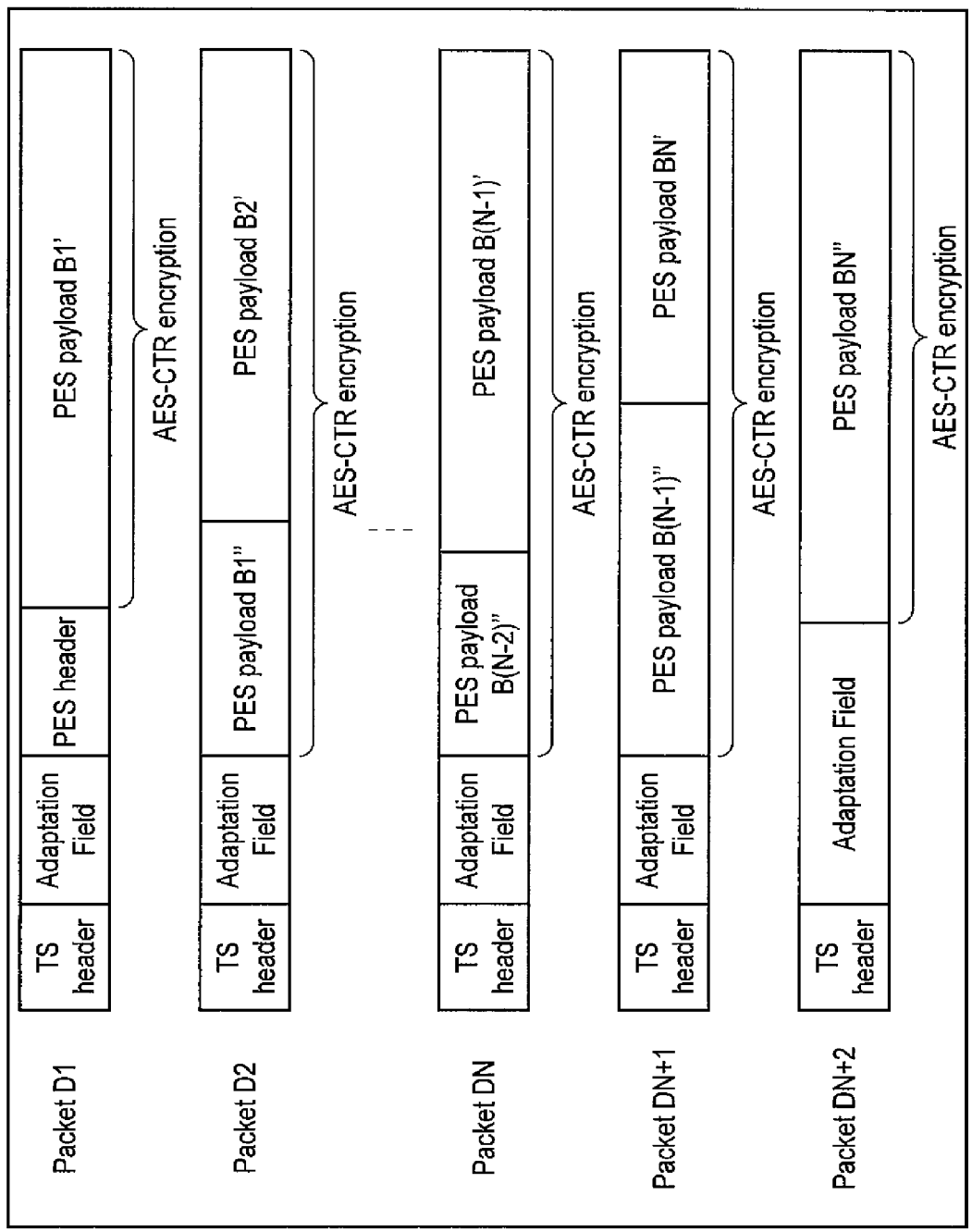
F I G. 9

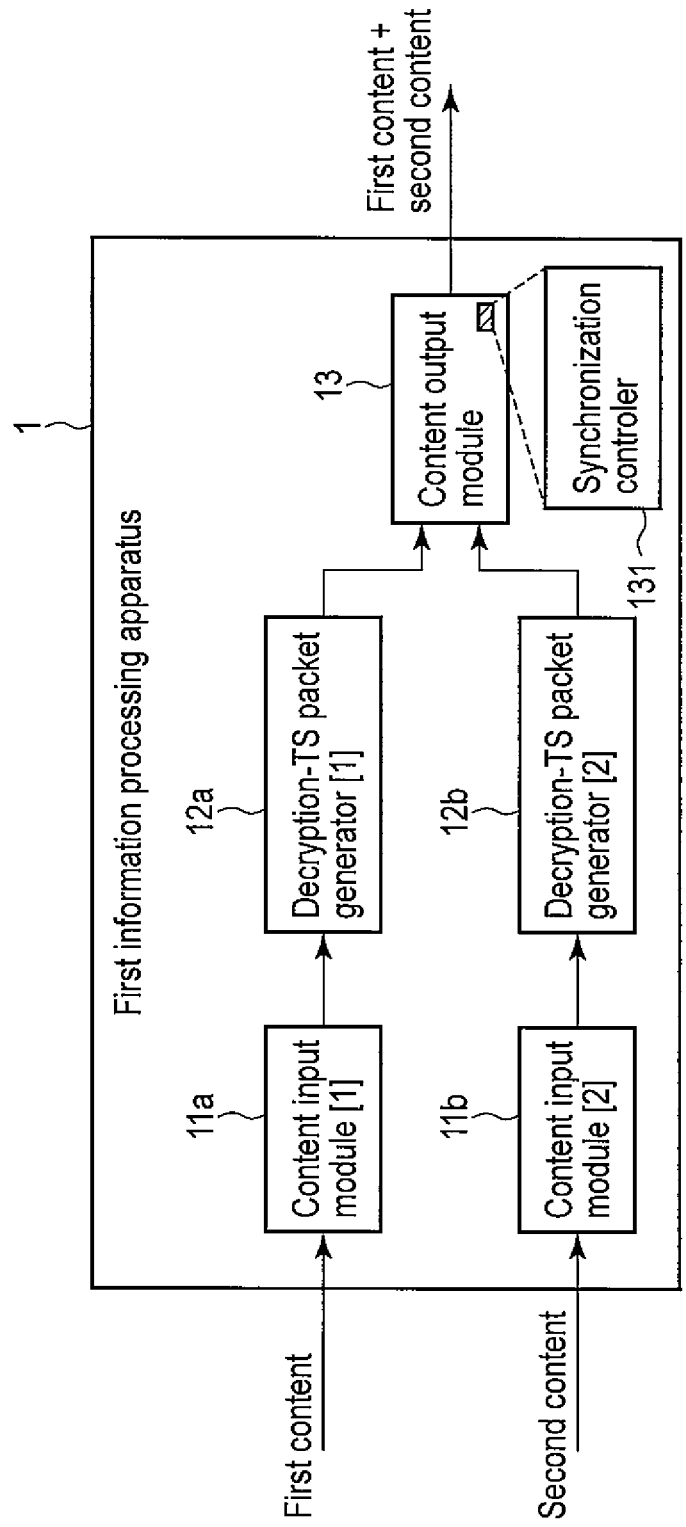
F I G. 14

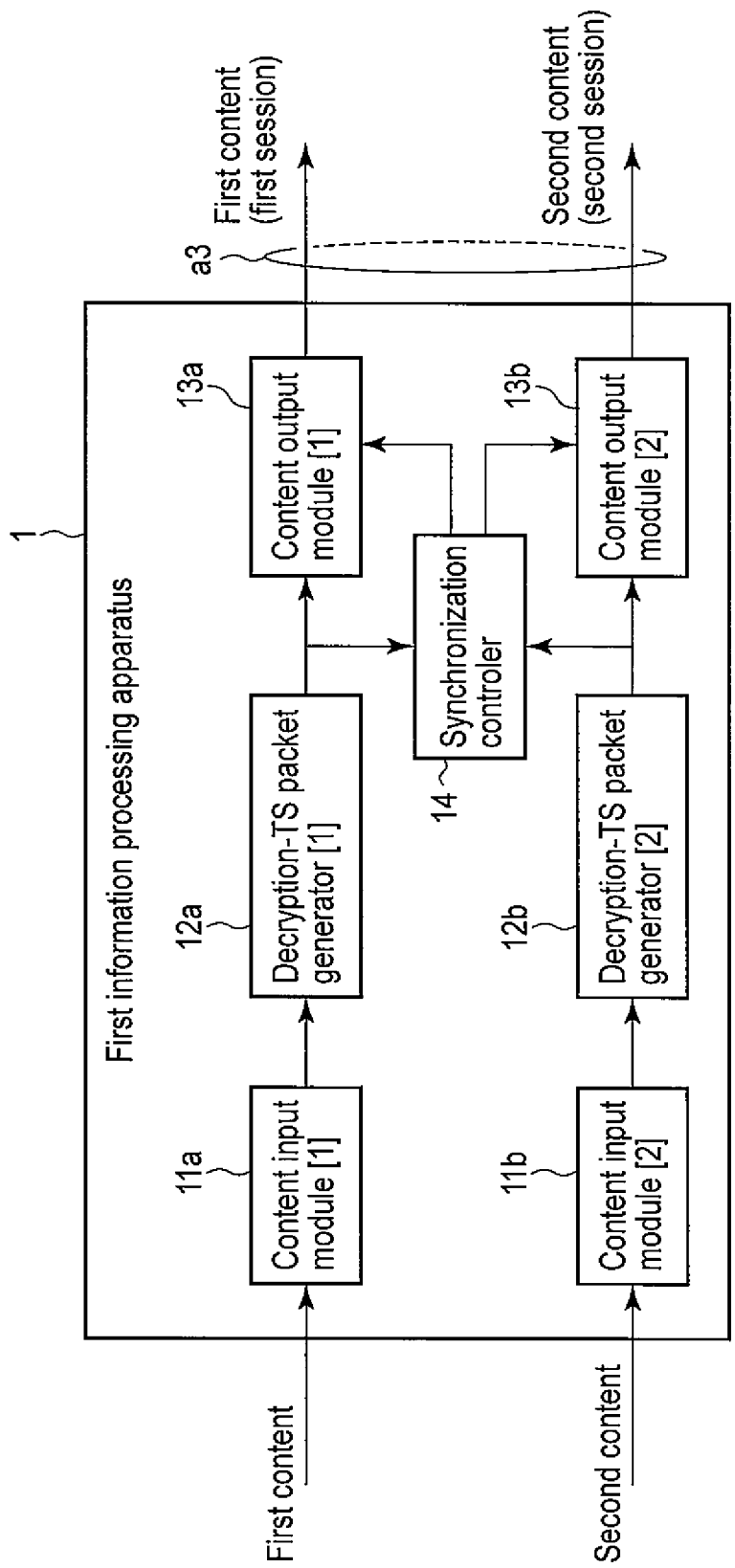
F I G. 15

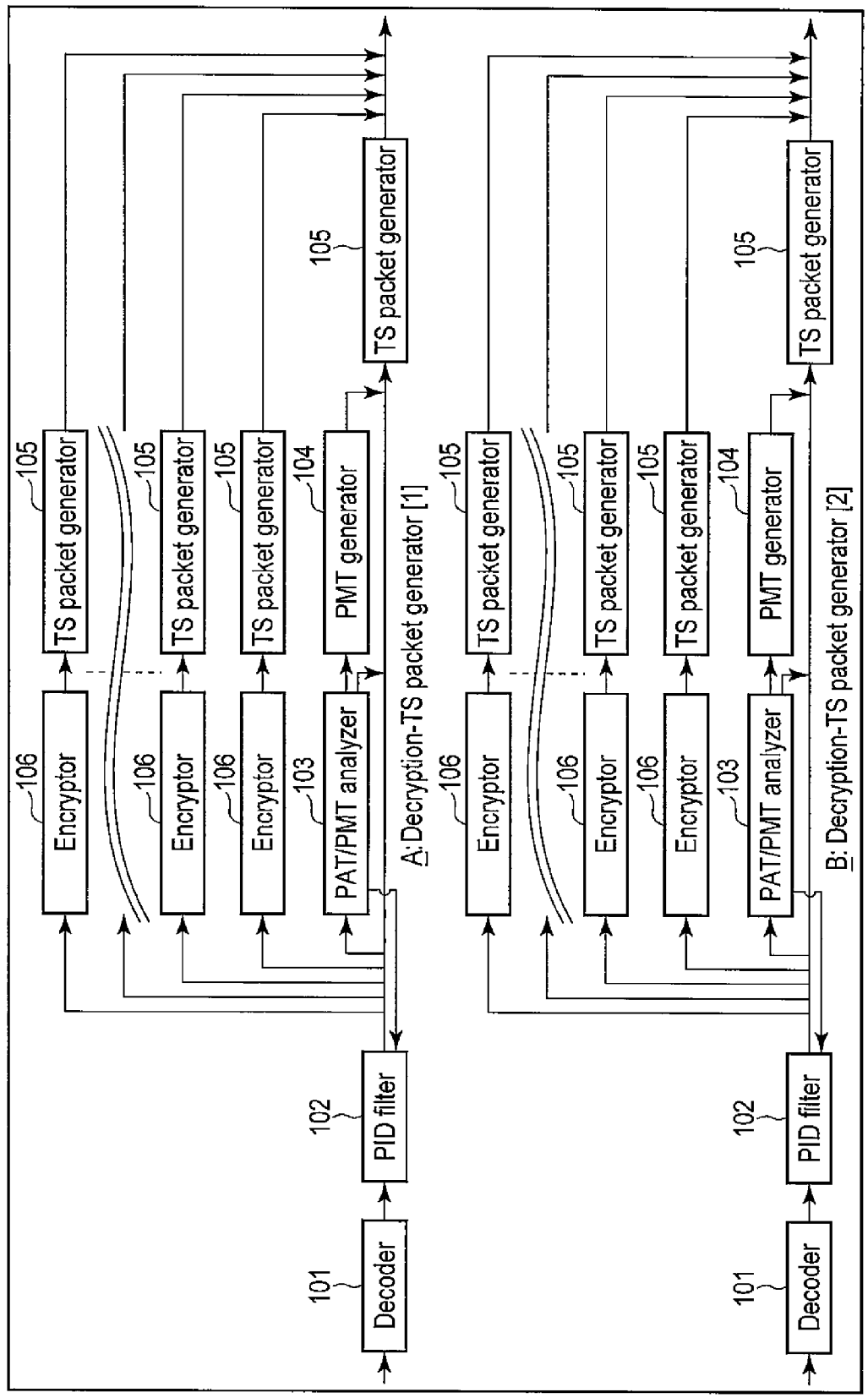
F I G. 16

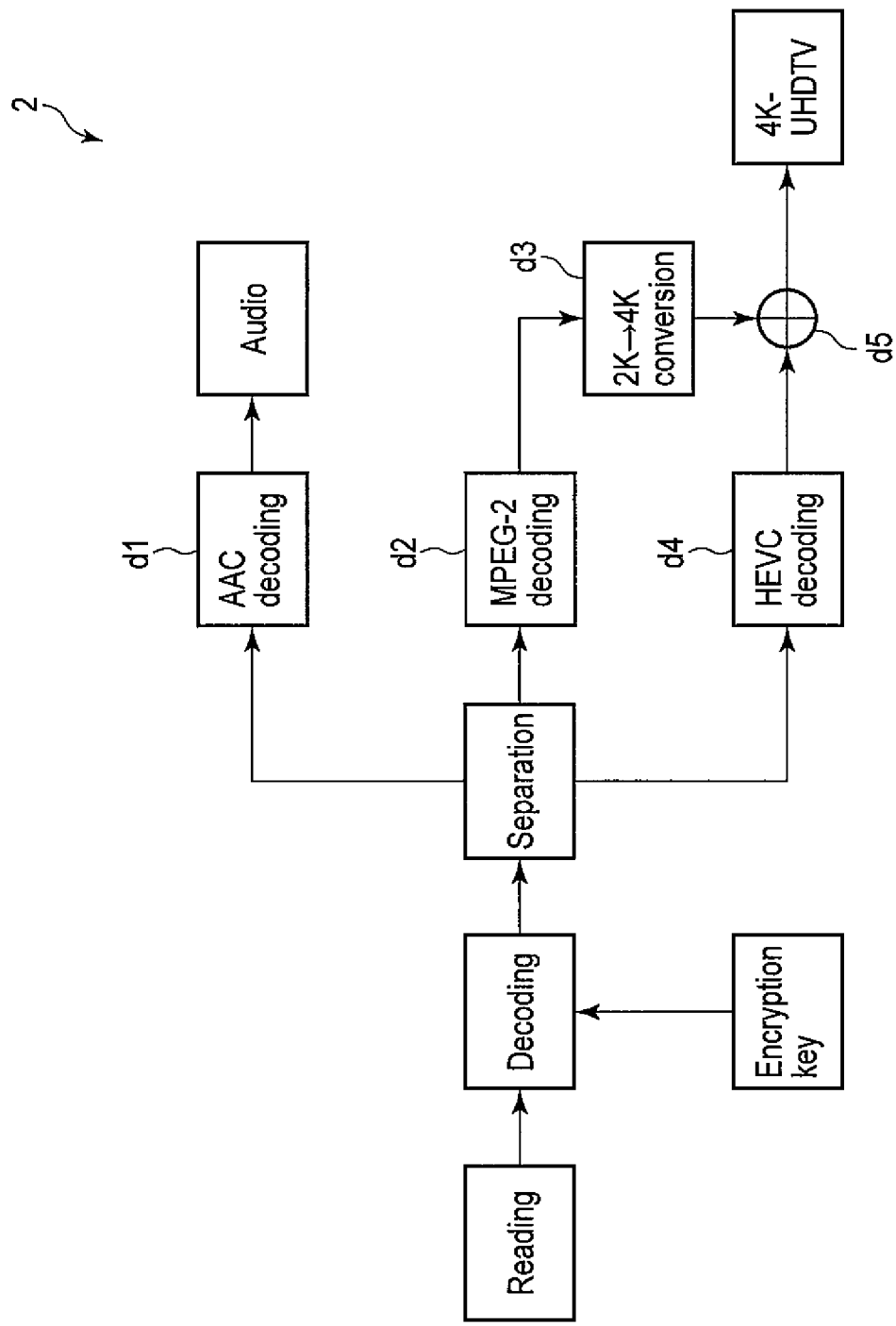
F I G. 17

INFORMATION PROCESSING APPARATUS, CONTENT TRANSMISSION METHOD AND STORAGE MEDIUM

CROSS-REFERENCE TO RELATED APPLICATIONS

This application is a Continuation application of PCT Application No. PCT/JP2013/058160, filed Mar. 21, 2013 and based upon and claiming the benefit of priority from Japanese Patent Application No. 2013-005403, filed Jan. 16, 2013, the entire contents of all of which are incorporated herein by reference.

FIELD

Embodiments described herein relate generally to a content transmission technology suitable for an information processing apparatus that can receive content such as television program data, for example.

BACKGROUND

In recent years, television program data have been digitalized, and been broadcast through ground waves or satellites or distributed via the Internet or a CDN (Contents Delivery Network). The digitalized television program data does not deteriorate, and can be reproduced, making copyright protection be a key issue.

Therefore, various proposals have been made on copyright protection of content including television program data.

Digital television receivers tend to offer high-quality, high-definition images. A digital television receiver that is called a 4K television and is capable of displaying an image of 3,840× 2,160 pixels has recently gained attention as a next-generation model of a digital television receiver that is called a Full HD (High Definition) television and is capable of displaying an image of 1,920×1,080 pixels. As opposed to the 4K television, the Full HD television is also referred to as a 2K television.

As a method of distributing television program data for the 4K televisions, what is conceived is a method of distributing television program data of Full HD televisions (first content) by using, for example, ground waves (first transmission path), and distributing difference data (second content) between television program data of 4K televisions and television program data of Full HD televisions via, for example, the Internet or CDN (second transmission path). According to the method, alongside the 4K televisions, the Full HD televisions continue to be used.

By the way, home appliances have recently been connected together through wireless communication, such as Wi-Fi or the like that is compliant with the IEEE802.11 standard, without using cables. Accordingly, as a situation where a 4K television is used, the situation can happen where a 4K television that is provided as a home server and is connected to an indoor antenna terminal and a communication line terminal receives television program data, and the data is viewed through another 4K television in a different room that is wirelessly connected (third transmission path) to the 4K television.

In the case of the above distribution method for television program data of 4K televisions, some kind of copyright protection is applied to television program data of Full HD televisions that is distributed by using, for example, ground waves, and to the difference data (between television program data of 4K televisions and television program data of Full HD televisions) that is distributed via, for example, the Internet or CDN. Copyright protection methods thereof may be the same or different.

To transmit an image between 4K televisions that are wirelessly connected, some kind of copyright protection needs to be applied. According to general technique, a 4K television that is provided as a home server receives two items of data to which some kind of copyright protection is applied and decodes the two items of data, and combines two images to generate a 4K-television image, and encodes the image again and applies some kind of copyright protection before transmitting the image to another 4K television. After the data is received, the processes need to be completed without delay.

However, the re-encoding may cause deterioration in quality, and the processes are inevitably delayed due to the decoding and the re-encoding.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is an exemplary diagram showing the configuration of a decryption-TS packet generator in the information processing apparatus of the embodiment.

FIG. 6 is an exemplary diagram showing a transport stream of the first content input by the information processing apparatus of the embodiment.

FIG. 7 is an exemplary diagram showing a transport stream of the second content input by the information processing apparatus of the embodiment.

FIG. 9 is an exemplary diagram showing a transport stream of the second content generated by the information processing apparatus of the embodiment.

FIG. 14 is an exemplary diagram showing a first modified example of functional blocks associated with the content transmission process of the information processing apparatus of the embodiment.

FIG. 15 is an exemplary diagram showing a second modified example of functional blocks associated with the content transmission process of the information processing apparatus of the embodiment.

FIG. 16 is an exemplary diagram showing a modified example of the configuration of decoding-TS packet generator in the information processing apparatus of the embodiment.

FIG. 17 is an exemplary diagram showing an example of functional blocks associated with content playback process of another information processing apparatus that receives a packet group output by the information processing apparatus of the embodiment.

DETAILED DESCRIPTION

Various embodiments will be described hereinafter with reference to the accompanying drawings.

In general, according to one embodiment, an information processing apparatus includes a first input module, a second input module, a converter and an output module. The first input module is configured to receive a first packet group of first content to which a first copyright protection method is applied and which is output to a first transmission path. The second input module is configured to receive a second packet group of second content to which the first copyright protection method or a second copyright protection method is applied and which is output to a second transmission path. The converter is configured to re-packetize the first content packetized into the first packet group received by the first input module and the second content packetized into the second packet group received by the second input module, into a third packet group for outputting to a transmission path by applying a third copyright protection method. The output module is configured to output the third packet group of the first content and the second content generated by the converter to a third transmission path.

Figure 1:
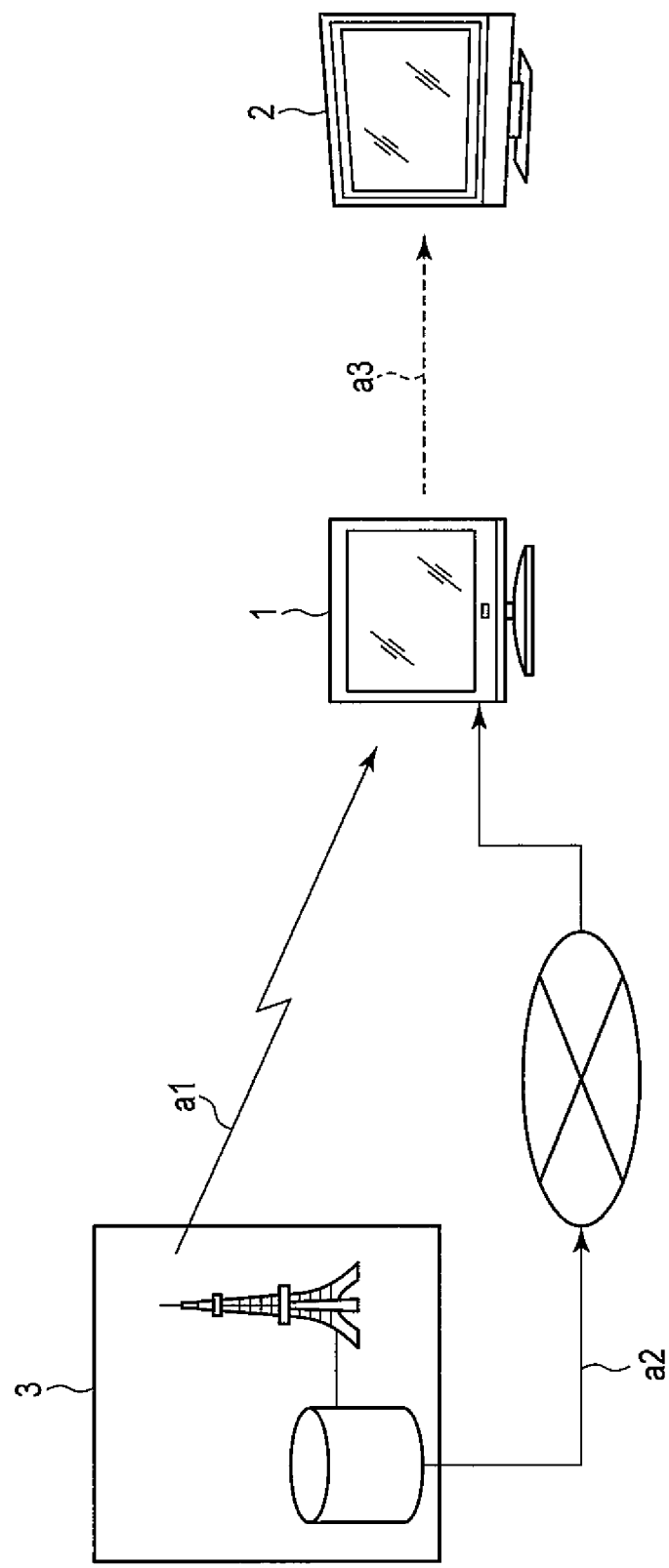
FIG. 1 is an exemplary diagram showing an example of an operation environment of an information processing apparatus according to an embodiment.

FIG. 1 is an exemplary diagram showing an example of an operation environment of an information processing apparatus 1 according to the present embodiment. For example, the information processing apparatus 1 is realized as a digital television receiver (4K television) capable of displaying an image of 3,840×2,160 pixels.

Figure 2:
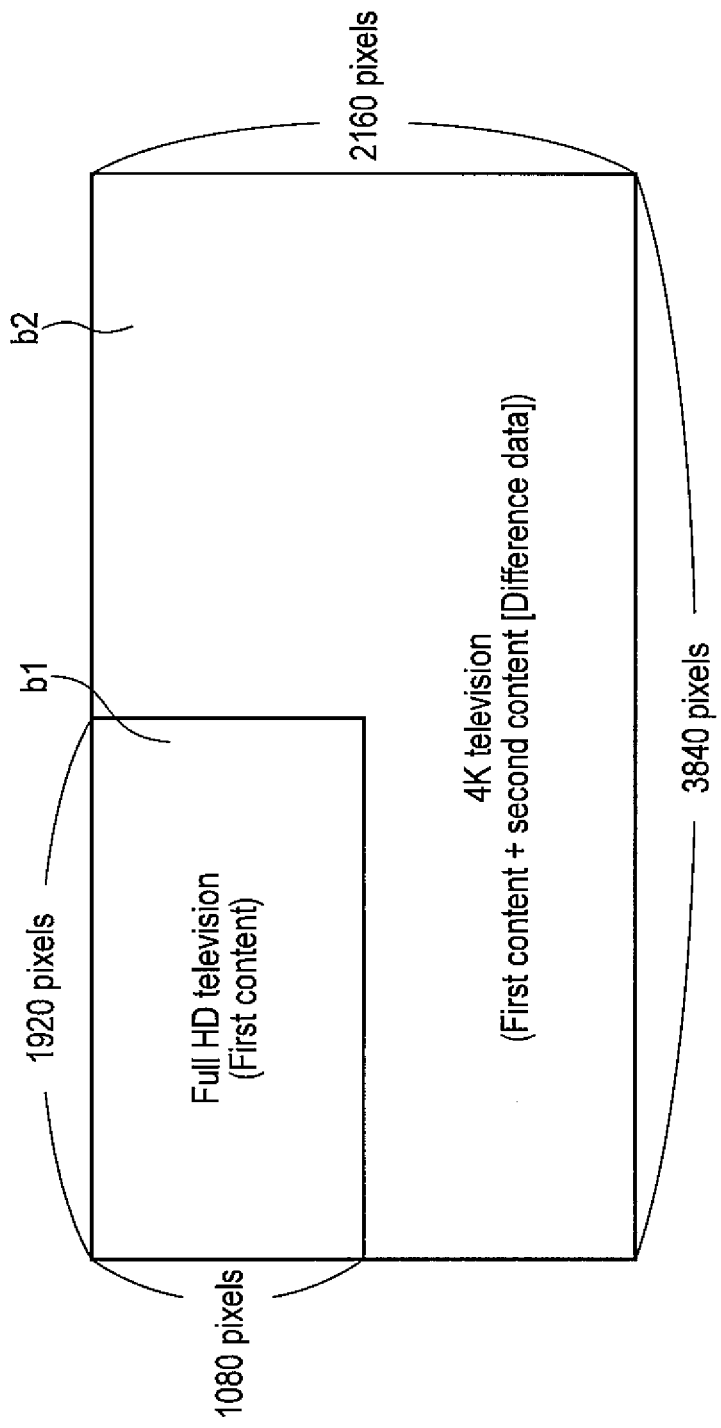
FIG. 2 is an exemplary diagram illustrating relationship between first content and second content received by the information processing apparatus of the embodiment.

Firstly, the information processing apparatus 1 includes a function of receiving first content (streaming data) that a content provider 3, such as broadcaster, distributes by using, for example, ground waves (a1 of FIG. 1). Secondly, the information processing apparatus 1 includes a function of receiving second content (streaming data) that the content provider 3 distributes via, for example, the Internet or CDN (a2 of FIG. 1). With reference to FIG. 2, the relationship between the first content and second content received by the information processing apparatus 1 will be described.

As shown in FIG. 2, an image for Full HD televisions includes 1,920×1,080 pixels (b1 of FIG. 2). An image for 4K televisions includes 3,840×2,160 pixels (b2 of FIG. 2). The first content and the second content are data for the same image. The first content is streaming data for Full HD televisions; the second content is difference data between a 4K-television image and a Full HD-television image (for generating a 4K-television image). The first content and the second content are formed as data of a MPEG2-TS (Transport Stream) format, for example.

As shown in FIG. 2, the Full HD-television image is in a different image format from that of the 4K-television image. Therefore, to generate a 4K-television image from the above-described first content and second content, on a Full HD-television image that is obtained by decoding the first content, a scaling process is performed to convert the Full HD-television image into the same image format as that of the 4K-television image; and the image is combined with an image that is obtained by decoding the second content. Since the second content includes a large number of pixels, the second content may be encoded by HEVC (High Efficiency Video Coding), for example.

Accordingly, the content that is distributed from the content provider 3 can be played as a Full HD-television image with the use of only the first content. The content also can be played as a 4K-television image with the use of both the first content and the second content. Therefore, in the same way as before, a Full HD television receives only the first content that is distributed by using, for example, ground waves. When distributing images, the content provider 3 applies some kind of copyright protection to the first content and the second content.

Refer to FIG. 1 again.

Thirdly, the information processing apparatus 1 includes a function of transmitting the first content and second content that are received from the content provider 3 to another information processing apparatus 2 through wireless communication that is compliant with the IEEE802.11 standard, for example (a3 of FIG. 1). The other information processing apparatus 2 is a 4K television, recorder, or the like, for example. When transmitting the first content and the second content to the other information processing apparatus 2, the information processing apparatus 1 applies copyright protection compliant with HDCP (High-bandwidth Digital Content Protection) 2.0, or a succeeding standard thereof, for example.

Figure 3:
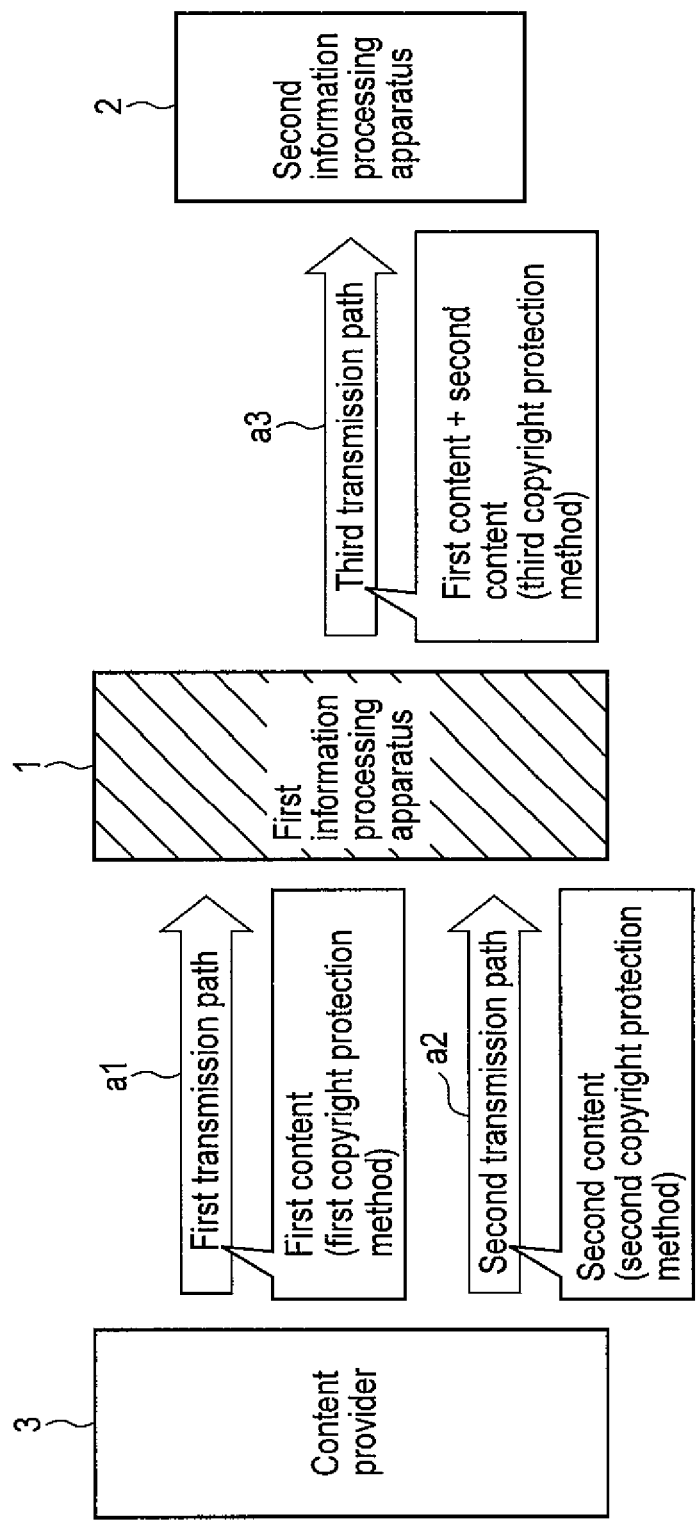
FIG. 3 is an exemplary diagram showing an outline of a process of transmitting content performed by the information processing apparatus of the embodiment.

That is, as shown in FIG. 3, the information processing apparatus 1 receives the first content, to which a first copyright protection method is applied and which is distributed via a first transmission path, and the second content, to which a second copyright protection method is applied and which is distributed via a second transmission path; and transmits both the first content and the second content via a single third transmission path by applying a third copyright protection method to both first content and the second content.

More, specifically, without decoding the received first content and second content (a process that might be executed in the case of using general technique), or without generating a 4K-television image and encoding the generated image again, the information processing apparatus 1 re-packetizes the first content that is packetized into a first packet group for distributing via the first transmission path by applying the first copyright protection method, and the second content that is packetized into a second packet group for distributing via the second transmission path by applying the second copyright protection method, into a third packet group for transmitting via the third transmission path by applying the third copyright protection method; and outputs the third packet group to the third transmission path.

Incidentally, in FIG. 3, for ease of explanation, the information processing apparatus 1 is referred to as a "first information processing apparatus 1", and the other information processing apparatus 2 as a "second information processing apparatus 2". Hereinafter, the information processing apparatus 1 similarly may be referred to as the "first information processing apparatus 1". Similarly, for ease of explanation, a copyright protection method applied to a process of distributing the first content via the first transmission path is referred to as a "first copyright protection method"; and a copyright protection method applied to a process of distributing the second content via the second transmission path as a "second copyright protection method". The "first copyright protection method" and the "second copyright protection method" may be, however, the same or different.

Therefore, without causing deterioration in quality due to the re-encoding, and without causing a delay associated with the decoding and the re-encoding, the information processing apparatus 1 realizes a process of efficiently transmitting the content (television program data of 4K televisions). Furthermore, the first content and the second content are transmitted via the single third transmission path. Therefore, the copyright of both can be protected by one copyright protection method.

Figure 4:
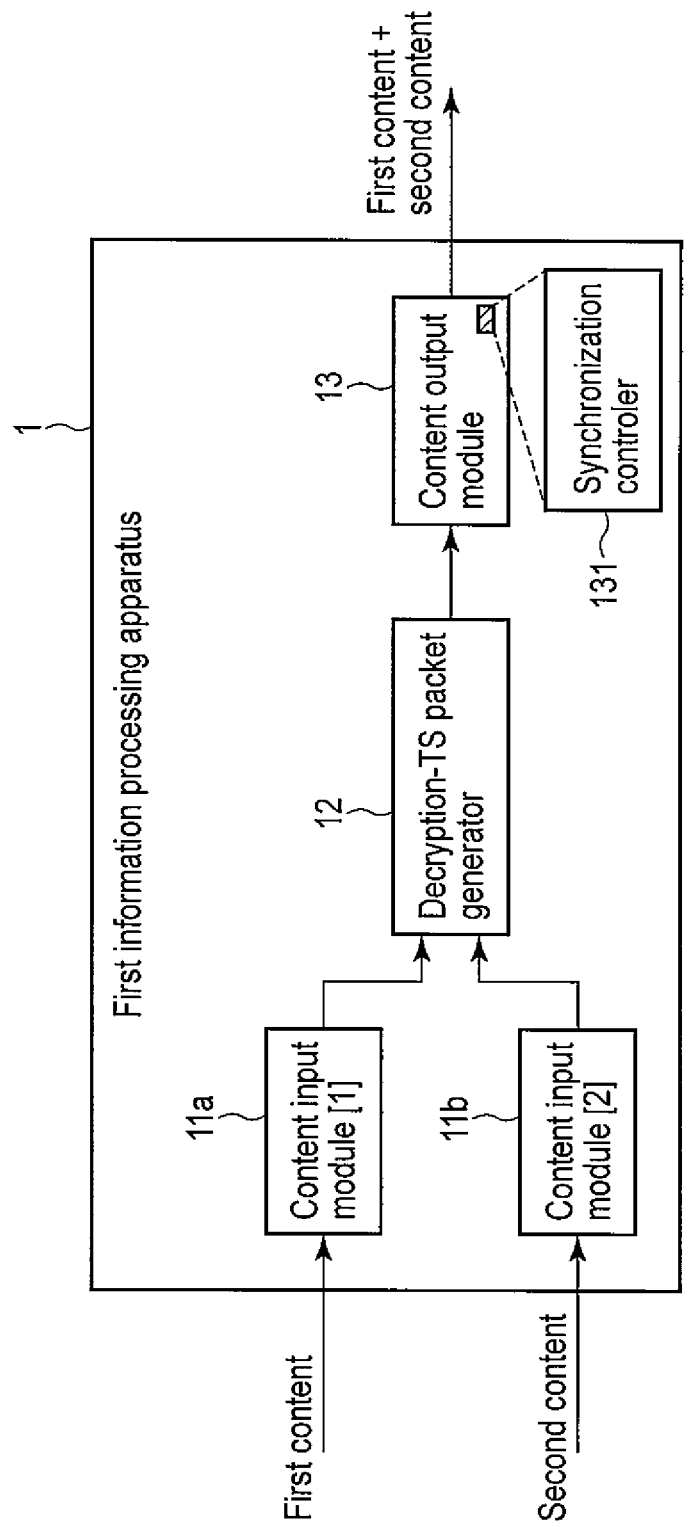
FIG. 4 is an exemplary diagram showing functional blocks associated with the content transmission process of the information processing apparatus of the embodiment.

FIG. 4 is an exemplary diagram showing functional blocks associated with the content transmission process of the information processing apparatus 1.

As shown in FIG. 4, the information processing apparatus 1 includes a content input module [1] 11a, a content input module [2] 11b, a decryption-TS packet generator 12, and a content output module 13.

The content input module [1] 11a is a module that receives a packet group (first packet group) of the first content that is sent to the first transmission path by applying the first copyright protection method. The content input module [2] 11b is a module that receives a packet group (second packet group) of the second content that is sent to the second transmission path by applying the second copyright protection method.

The decryption-TS packet generator 12 is a module that re-packetizes the first content that is packetized into the first packet group which is input by the content input module [1] 11a, and the second content that is packetized into the second packet group which is input by the content input module [2] 11b, into the third packet group for outputting to the third transmission path by applying the third copyright protection method. Incidentally, the "decryption" of the decryption-TS packet generator 12 means "decryption" corresponding to the encryption required for the first copyright protection method and the encryption required for the second copyright protection method, and does not mean "decoding" corresponding to the encoding (for obtaining an image).

The content output module 13 is a module that outputs the third packet group generated by the decryption-TS packet generator 12 to the third transmission path (and to the other information processing apparatus 2). The content output module 13 includes a synchronization controller 131 that outputs a third packet associated with the first content, and a third packet associated with the second content to the third transmission path in such a way that the third packets are in synchronization with each other.

More specifically, the synchronization controller 131 performs a control process to make it unnecessary for the other information processing apparatus 2 that receives the third packet group to do buffering of large amounts. In this case, an expected case where the other information processing apparatus 2 is required to do buffering of large amounts is a case where only packets of either the first content or the second content are continuously transmitted, and a situation arises where the other information processing apparatus 2 waits a long time for the other corresponding packets in terms of time to be transmitted. Based on time information of the first packet group and time information of the second packet group, which are contained in a third packet group generated by the decryption-TS packet generator 12, the synchronization controller 131 controls a process of transmitting the third packet group to the third transmission path.

FIG. 5 is an exemplary diagram showing the configuration of the decryption-TS packet generator 12.

As shown in FIG. 5, the decryption-TS packet generator 12 includes a decoder [1] 101a, a decoder [2] 101b, a PID (Packet Identification) filter [1] 102a, a PID filter [2] 102b, a PAT (Program Association Table)/PMT (Program Map Table) analyzer 103, a PMT generator 104, a plurality of TS packet generators 105, and a plurality of encryptors 106.

To the decoder [1] 101a, the first packet group of the first content (which is input from the content input module [1] 11a) is input. To the decoder [2] 101b, the second packet group of the second content (which is input from the content input module [2] 11b) is input. FIG. 6 shows the first packet group of the first content that is input into the decoder [1] 101a (or a transport stream of the first content to which the first copyright protection method is applied and which is transmitted to the first transmission path). FIG. 7 shows the second packet group of the second content that is input into the decoder [2] 101b (or a transport stream of the second content to which the second copyright protection method is applied and which is transmitted to the second transmission path).

As described above, the first content and the second content are formed as data of a MPEG2-TS format, for example. According to the MPEG2-TS format, one PES (Packetized Elementary Stream) header is provided for one PES payload; a combination of the PES header and the PES payload appears repeatedly. Each pair of the PES header and the PES payload is divided into a plurality of TS packets as shown in FIG. 6 and FIG. 7; in accordance with each copyright protection method, TS payloads are AES-CBC encrypted.

Incidentally, in FIG. 6 and FIG. 7, for ease of explanation, each TS packet, and each segment of a PES payload that is divided into a plurality of TS packets are represented by serial numbers, such as Ax and Bx. As shown in FIG. 6 and FIG. 7, in order to keep an amount of packets transmitted at a constant level, a null packet is added when necessary.

For example, the decoder [1] 101a uses information recorded on a B-CAS card (Registered Trademark) or the like, which is inserted into the information processing apparatus 1, to AES-CBC decode a TS payload portion of the first packet group. For example, the decoder [2] 101b uses an encryption key that is obtained as an authentication process and a key exchange process are carried out between the content provider 3 and the information processing apparatus 1, to AES-CBC decode a TS payload portion of the second packet group.

The decryption-TS packet generator 12 identifies the type of each packet of the first packet group by using the PID filter [1] 102a, and the type of each packet of the second packet group by using the PID filter [2] 102b. That is, the first packet group that is subjected to the AES-CBC decoding of the TS payload portion by the decoder [1] 101a is supplied to the PID filter [1] 102a; the second packet group that is subjected to the AES-CBC decoding of the TS payload portion by the decoder [2] 101b is supplied to the PID filter [2] 102b.

The PID filter [1] 102a and the PID filter [2] 102b extract a PID contained in a TS header of each packet, and performs filtering based on the PID. The decryption-TS packet generator 12 sets, as initial values of the PIDs to be filtered, a PAT (PID=0x0000) and a null packet (PID=0x1fff) into the PID filter [1] 102a and the PID filter [2] 102b.

If a packet is PAT, the packet is supplied to the PAT/PMT analyzer 103. The PAT/PMT analyzer 103 analyzes the PAT, and acquires a PID (PMT PID) of PMT. After the PMT PID is acquired, the acquired PMT PID is added as a to-be-filtered PID of the PID filter [1] 102a or PID filter [2] 102b (that has detected the packet of the PAT). The packet of the PAT is supplied to a TS packet generator 105. The TS packet generator 105 re-packetizes the packet into a third packet to which the third copyright protection method is applied and which is sent to the third transmission path.

If the packet is PMT (whose PID is added as what is to be filtered), the packet is supplied to the PAT/PMT analyzer 103. The PAT/PMT analyzer 103 analyzes the PMT, and acquires a PID (ES PID) of ES (Elementary Stream) such as video, audio, and captions. After the ES PID is acquired, the acquired ES PID is added as a to-be-filtered PID of the PID filter [1] 102a or PID filter [2] 102b (that has detected the packet of the PMT). The PMT packet is supplied to the PMT generator 104.

To the PMT received from the PAT/PMT analyzer 103, the PMT generator 104 adds a descriptor (e.g. registration_descriptor in the case of HDCP2.0) that indicates the content is encrypted by the third copyright protection method. The PMT generator 104 then supplies, to a TS packet generator 105, the packet of the PMT to which the descriptor has been added. As in the above case of the PAT packet, the TS packet generator 105 re-packetizes the packet into a third packet to which the third copyright protection method is applied and which is sent to the third transmission path.

If the packet is an ES packet (whose PID is added as what is to be filtered), the decryption-TS packet generator 12 performs a process described below for each combination of the PES header and the PES payload.

If payload_unit_start_indicator of the TS header is 1, the decryption-TS packet generator 12 assumes that the PES header is contained in the packet. If the size of the remaining PES payload is greater than 184 Bytes, which is the total size of the TS payload and Adaptation Field, the decryption-TS packet generator 12 extracts, from a beginning portion of the remaining PES payload, data of 176 Bytes, which is smaller than the 184 Bytes and is a maximum multiple of 16 (which is the size of an AES-CTR encryption key for AES-CTR encryption that is required for the third copyright protection method). The decryption-TS packet generator 12 then supplies the extracted data to an encryptor 106. The encryptor 106 AES-CTR-encrypts the supplied data of PES payload. The encrypted data of PES payload is supplied to a TS packet generator 105. The TS packet generator 105 inserts Adaptation Field that is padded with 8 bytes of Stuffing Byte ahead of the encrypted data of PES payload, thereby generating one TS packet data item (third packet).

The decryption-TS packet generator 12 follows a similar procedure until the size of the remaining PES payload goes down below 184 Bytes to generate TS packet data (third packets). If the size of the remaining PES payload is less than or equal to 184 Bytes, all the remaining PES payload has been AES-CTR encrypted by the encryptors 106; the TS packet generator 105 inserts, ahead of the encrypted PES payload, Adaptation Field that is padded with Stuffing Byte so as to make the size of the TS packet data equal to 184 Bytes, thereby generating one TS packet data item (third packet).

The decryption-TS packet generator 12 includes a plurality of encryptors 106 and a plurality of TS packet generators 105. Therefore, the above-described processes of generating a plurality of TS packet data items (third packets) can be performed in parallel.

Incidentally, if the packet contains a PES header, the decryption-TS packet generator 12 sets an AES-CTR encryption key and an initial vector for the ES PID thereof. According to the present embodiment, the encryption key is the same as the initial value. The value of the initial vector is obtained by adding, to the previous value of initial vector, a value that is calculated by adding 15 to a total PES payload size associated with the previous PES header of the ES PID and dividing the resultant value by 16. In this case, the initial values of the encryption key and initial vector are values that are calculated in a key exchange process of the second copyright protection method. Furthermore, the decryption-TS packet generator 12 inserts the encryption key and part of initial vector into the PES header.

For example, in the case of HDCP2.0, into the PES header, a PES_private_data field is inserted; inputCtr and streamCtr, which are components of the initial vector, are described. Based on a combination of a key exchange process performed between the information processing apparatus 1 and the other information processing apparatus 2, and information of the PES header received from the information processing apparatus 1, the other information processing apparatus 2 can obtain an encryption key and an initial vector to properly decode the PES payload.

Figure 8:
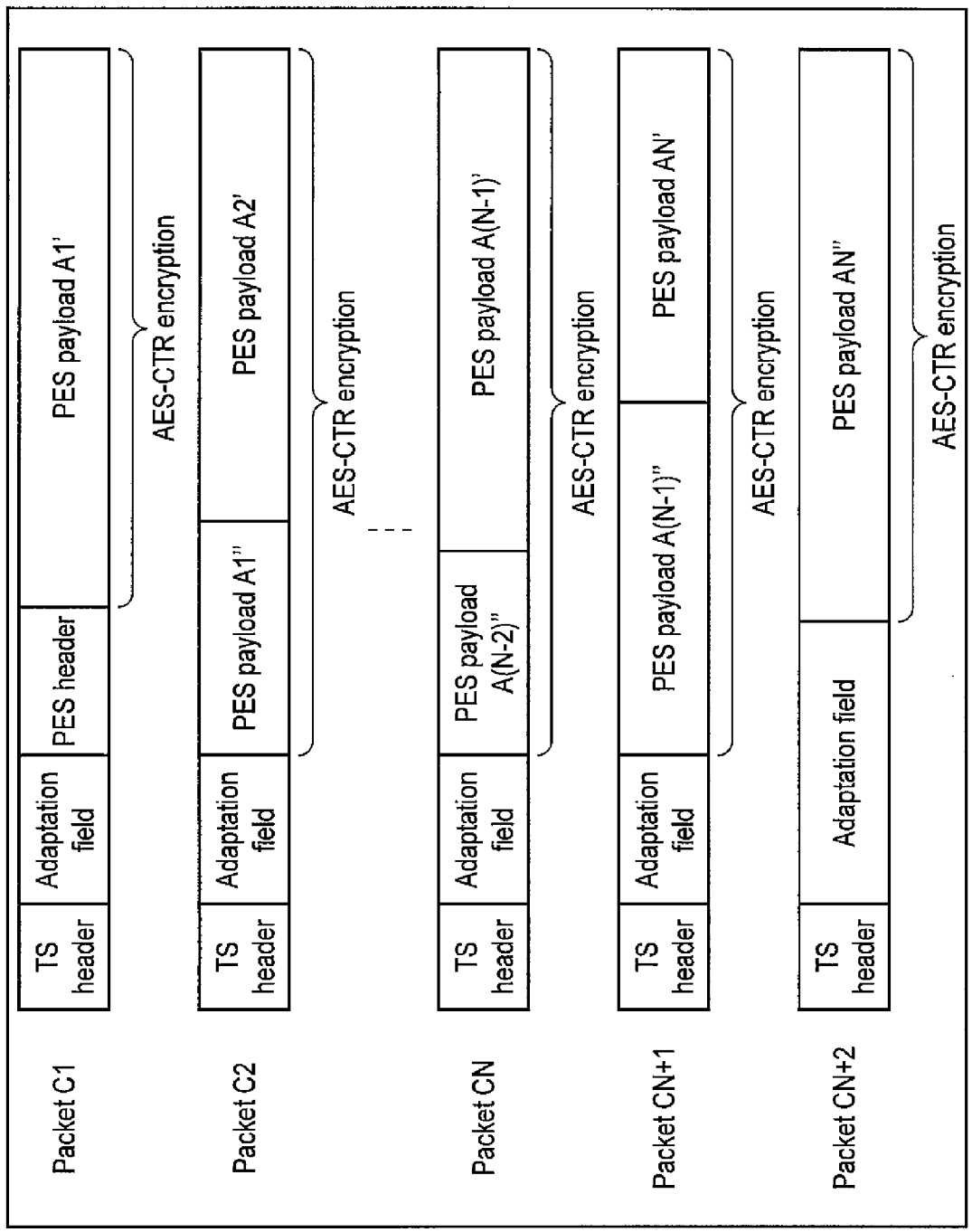
FIG. 8 is an exemplary diagram showing a transport stream of the first content generated by the information processing apparatus of the embodiment.

FIG. 8 shows the third packet group of the first content generated by the decryption-TS packet generator 12. FIG. 9 shows the third packet group of the second content generated by the decryption-TS packet generator 12. As shown in FIG. 8, the PES payload of the third packet group of the first content includes only PES payloads A1 to AN of the first packet group of the first content shown in FIG. 6. As shown in FIG. 9, the PES payload of the third packet group of the second content includes only PES payloads B1 to BN of the first packet group of the second content shown in FIG. 7. As shown in FIG. 8 and FIG. 9, as in the case of FIG. 6 and FIG. 7, each pair of the PES header and the PES payload is divided into a plurality of TS packets; in accordance with the third copyright protection method, TS payloads are AES-CTR encrypted.

Figure 10:
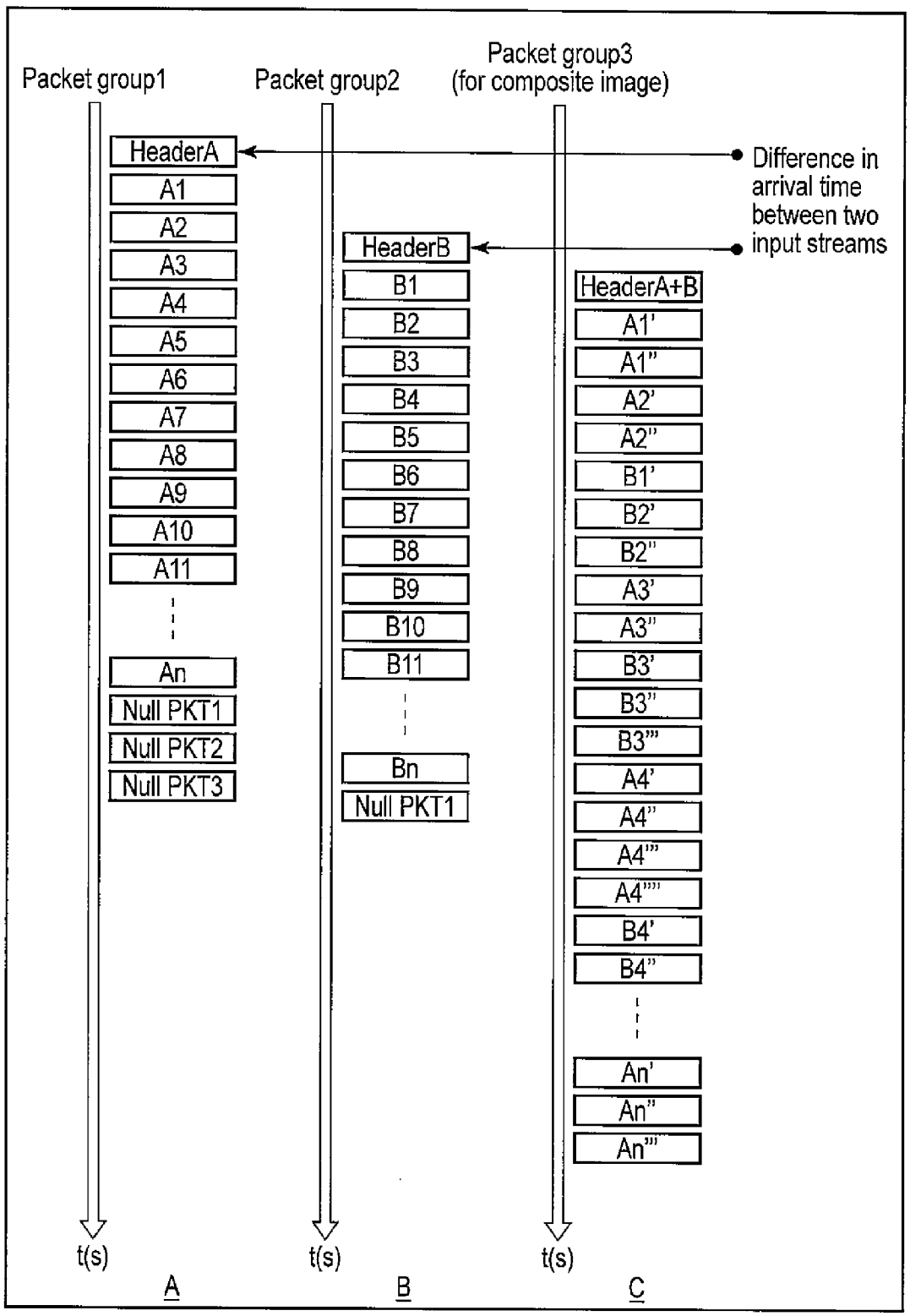
FIG. 10 is an exemplary diagram showing a first packet arrangement example of a packet group output by the information processing apparatus of the embodiment.

The TS packets generated by the decryption-TS packet generator 12 are transmitted by the content output module 13 to the third transmission path (and to the other information processing apparatus 2). FIG. 10 is an exemplary diagram showing a first packet arrangement example of the third packet group (of the first content plus the second content) on a time axis that is output by the content output module 13.

IN FIG. 10, "A" shows arrangement of packets of the first packet group of the first content that the information processing apparatus 1 inputs; "B" shows arrangement of packets of the second packet group of the second content that the information processing apparatus 1 inputs; "C" shows arrangement of packets of the third packet group (of the first content and second content) that the information processing apparatus 1 outputs.

As shown in FIG. 10, the information processing apparatus 1 separates the packets for the first content from the packets for the second content, and transmits both of the packets to the third transmission path. As shown in FIG. 10, the synchronization controller 131 of the content output module 13 mixes, as an array, the packets for the first content and the packets for the second content in such a way that packets of the first content and second content, or packet groups of the first content and second content, are alternately arranged in synchronization, for example. As a result, the other information processing apparatus 2 that receives the third packet group does not need to perform buffering of large amounts.

Figure 11:
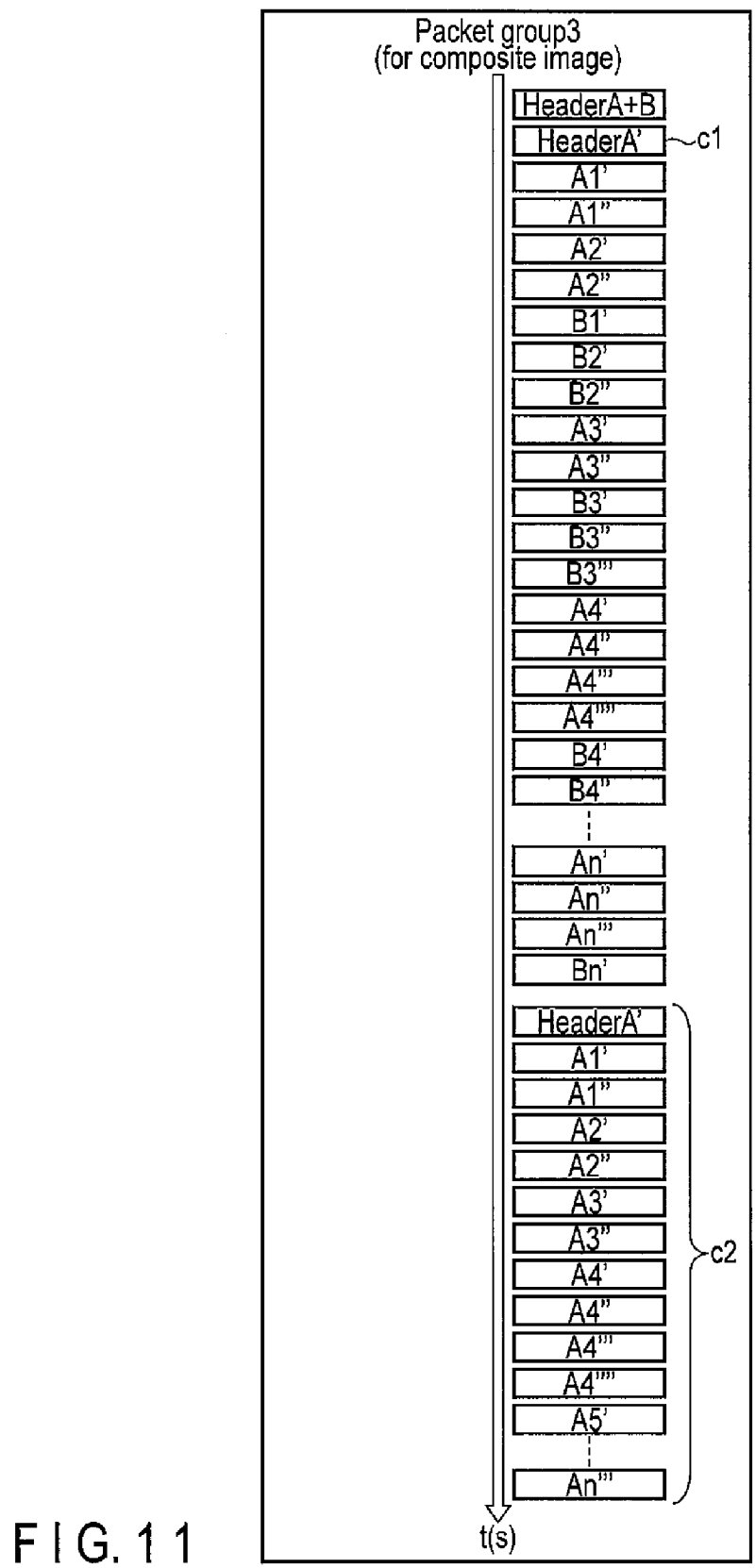
FIG. 11 is an exemplary diagram showing a second packet arrangement example of a packet group output by the information processing apparatus of the embodiment.

FIG. 11 is an exemplary diagram showing a second packet arrangement example of the third packet group (of the first content plus the second content) on a time axis that is output by the content output module 13.

As shown in FIG. 11, behind the third packet group (of the first content plus the second content) for 4K televisions, the third packet group (of the first content) for Full HD televisions is added (c2 of FIG. 11). Moreover, a header is added to identify both (c1 of FIG. 11). In this manner, (even though the total amount of data grows), in the other information processing apparatus 2, two types of data, i.e. the data for 4K televisions and the data for Full HD televisions, can be stored as one stream.

Here, with reference to FIG. 12A, FIG. 12B, FIG. 13A and FIG. 13B, the flow of a copyright protection method conversion process performed by the information processing apparatus 1 will be described again.

Figure 12A:
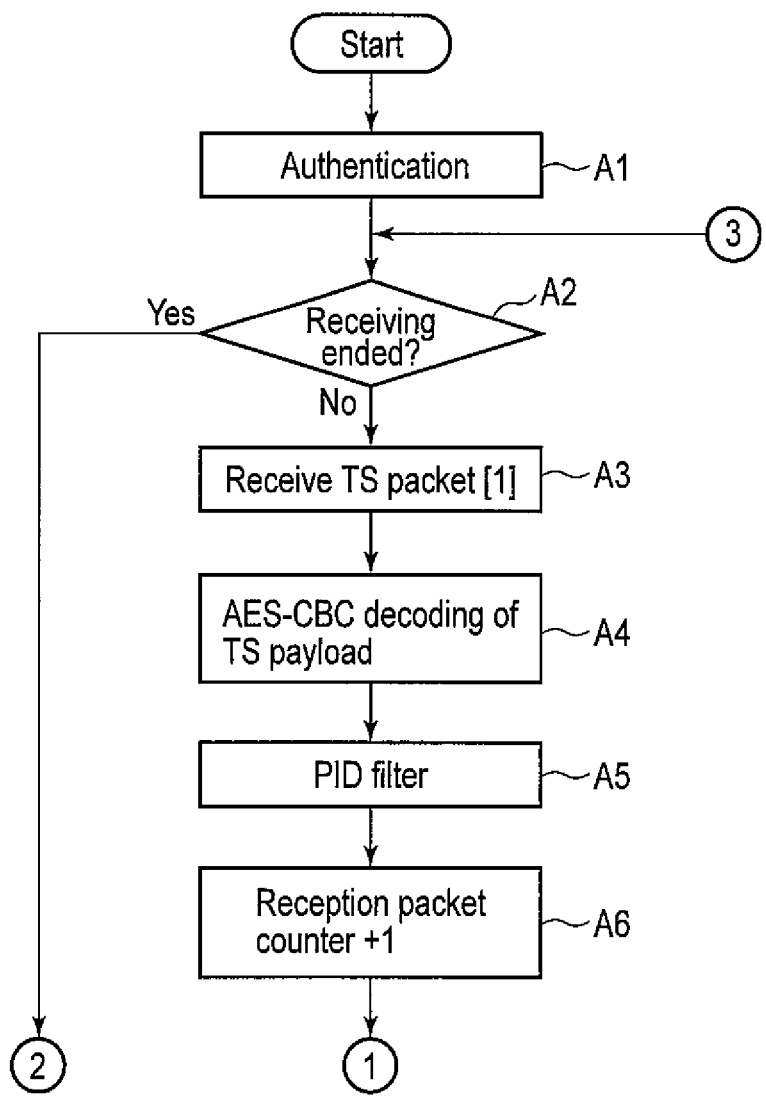
FIG. 12A is an exemplary first flowchart showing a procedure of generating a TS packet for transmission in the information processing apparatus of the embodiment.
Figure 12B:
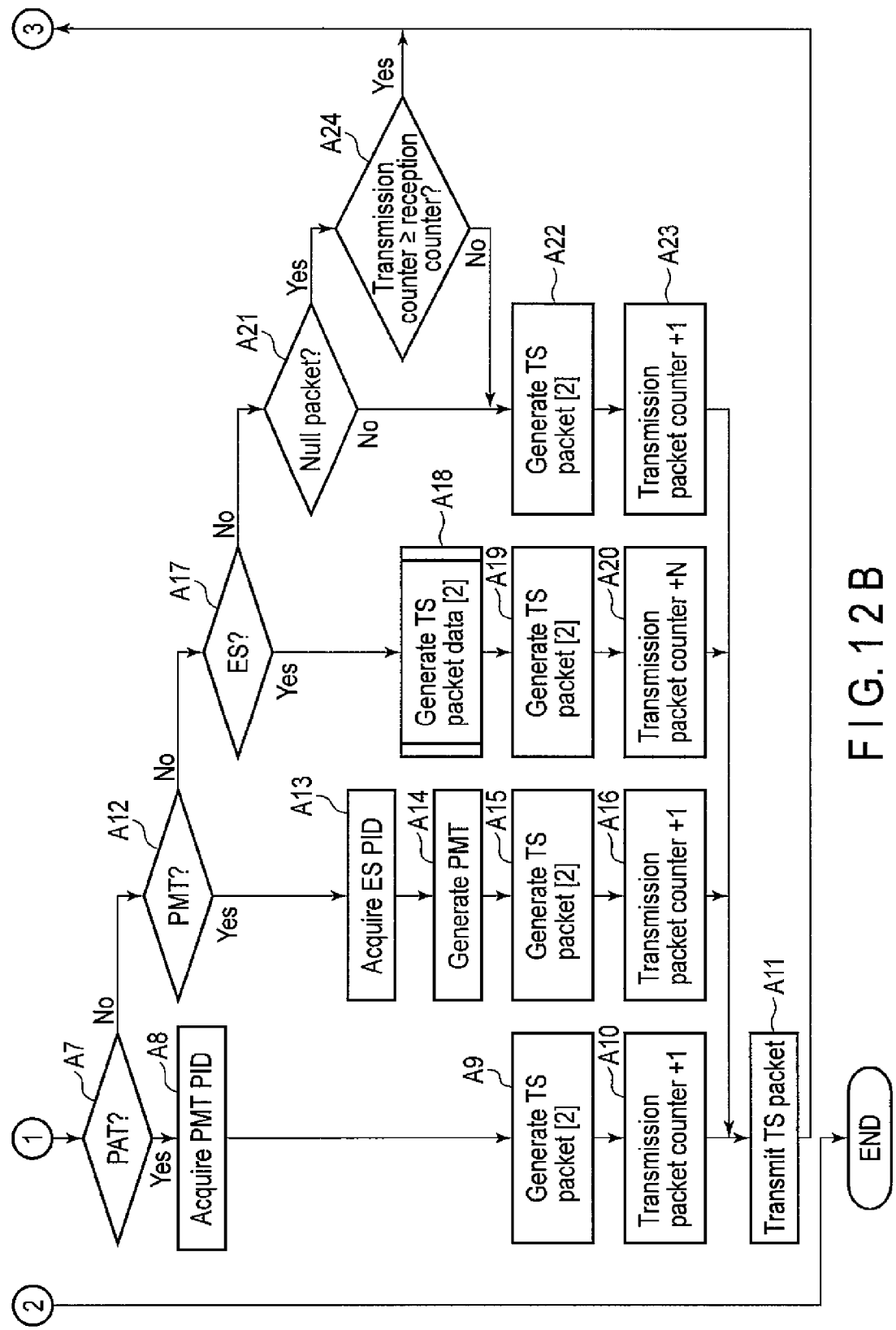
FIG. 12B is an exemplary second flowchart showing a procedure of generating a TS packet for transmission in the information processing apparatus of the embodiment.

FIG. 12A and FIG. 12B are exemplary flowcharts showing a procedure of generating a TS packet for transmission. In FIG. 12A and FIG. 12B, a TS packet [1] represents a TS packet that is received from the content provider 3, and a TS packet [2] represents a TS packet that is transmitted to the other information processing apparatus 2. TS packet data [2] represents data that is stored in the TS packet [2].

In order to reduce the amount to be transmitted, the decryption-TS packet generator 12 removes a received null packet when necessary (YES of block A21, YES of A24). In accordance with the third copyright protection method, an authentication and key exchange process with the other information processing apparatus 2 is carried out (block A1), and the encryption key and part of initial vector of content data that is transmitted to the other information processing apparatus 2 is determined. According to the present embodiment, for all the ESs, the initial values of pairs of the encryption keys and initial vectors are the same. Depending on the second copyright protection method, the initial values may be, however, different for each ES.

In one example, from the content provider 3, a MPEG2-TS packet and HEVC are sequentially received (block A3). A TS payload portion is AES-CBC decoded with a decryption key (block A4). In this case, an initial vector for AES-CBC decoding is a common value among services.

The decryption-TS packet generator 12 identifies the type of the packet received by the PID filter (block A5). The initial values of the to-be-filtered PIDs are a PAT (PID=0x0000) and a null packet (PID=0x1fff). Each time a packet is received, the decryption-TS packet generator 12 adds 1 to a reception packet counter (block A6).

If the received packet is PAT (YES of block A7), the decryption-TS packet generator 12 acquires a PID of PMT by analyzing the PAT (block A8), and adds the PMT PID as a to-be-filtered PID of the PID filter. The decryption-TS packet generator 12 generates the received packet just as a transmission packet to the other information processing apparatus 2 (block A9), and adds 1 to a transmission packet counter (block A10).

If the received packet is PMT (NO of block A7, YES of A12), the decryption-TS packet generator 12 acquires a PID of ES by analyzing the PMT (block A13), and adds the ES PID of video, audio, captions, and the like as a to-be-filtered PID of the PID filter. The decryption-TS packet generator 12 adds, to the received PMT, a descriptor (e.g. registration_descriptor in the case of HDCP2.0) that indicates the content is encrypted by the third copyright protection method (block A14), and generates as a transmission packet to the other information processing apparatus 2 (block A15), and adds 1 to the transmission packet counter (block A16).

If the received packet is ES (NO of block A12, and YES of A17), the decryption-TS packet generator 12 sets initial value 0 into a generated TS packet number N. When payload_unit_start_indicator of the TS header contained in the received packet is 1, the decryption-TS packet generator 12 assumes that the PES header is contained. If the size of the remaining PES payload is greater than 184 Bytes, which is the total size of the TS payload and Adaptation Field, the decryption-TS packet generator 12 extracts, from a beginning portion of the remaining PES payload, data of 176 Bytes, which is smaller than the 184 Bytes and is a maximum multiple of 16 (which is the size of an AES-CTR encryption key), to be AES-CTR encrypted. The decryption-TS packet generator 12 inserts Adaptation Field that is padded with 8 bytes of Stuffing Byte ahead of the encrypted PES payload, thereby generating one TS packet data item (blocks A18, A19), and adds 1 to the generated TS packet number N.

The decryption-TS packet generator 12 follows a similar procedure until the size of the remaining PES payload goes down below 184 Bytes to generate TS packet data, and adds 1 to the generated TS packet number N every time. If the remaining size of the remaining PES payload is less than or equal to 184 Bytes, the decryption-TS packet generator 12 AES-CTR-encrypts all the remaining PES payload. The decryption-TS packet generator 12 inserts, ahead of the encrypted PES payload, Adaptation Field that is padded with Stuffing Byte so as to make the size of the TS packet data equal to 184 Bytes, thereby generating one TS packet data item (blocks A18, A19), and adds 1 to the generated TS packet number N.

If the received packet contains a PES header, the decryption-TS packet generator 12 sets an AES-CTR encryption key and an initial vector for the ES PID. According to the present embodiment, the encryption key is the same as the initial value. The value of the initial vector is obtained by adding, to the previous value of initial vector, a value that is calculated by adding 15 to a total PES payload size associated with the previous PES header of the ES PID and dividing the resultant value by 16. In this case, the initial values of the encryption key and initial vector are values that are calculated in a key exchange process of the second copyright protection method.

Furthermore, the decryption-TS packet generator 12 inserts the encryption key and part of initial vector into the PES header. For example, in the case of HDCP2.0, into the PES header, a PES_private_data field is inserted; inputCtr and streamCtr, which are components of the initial vector, are described. Based on a combination of a key exchange process performed between the information processing apparatus 1 and the other information processing apparatus 2, and information of the PES header received from the information processing apparatus 1, the other information processing apparatus 2 can obtain an encryption key and an initial vector to properly decode the PES payload.

Figure 13A:
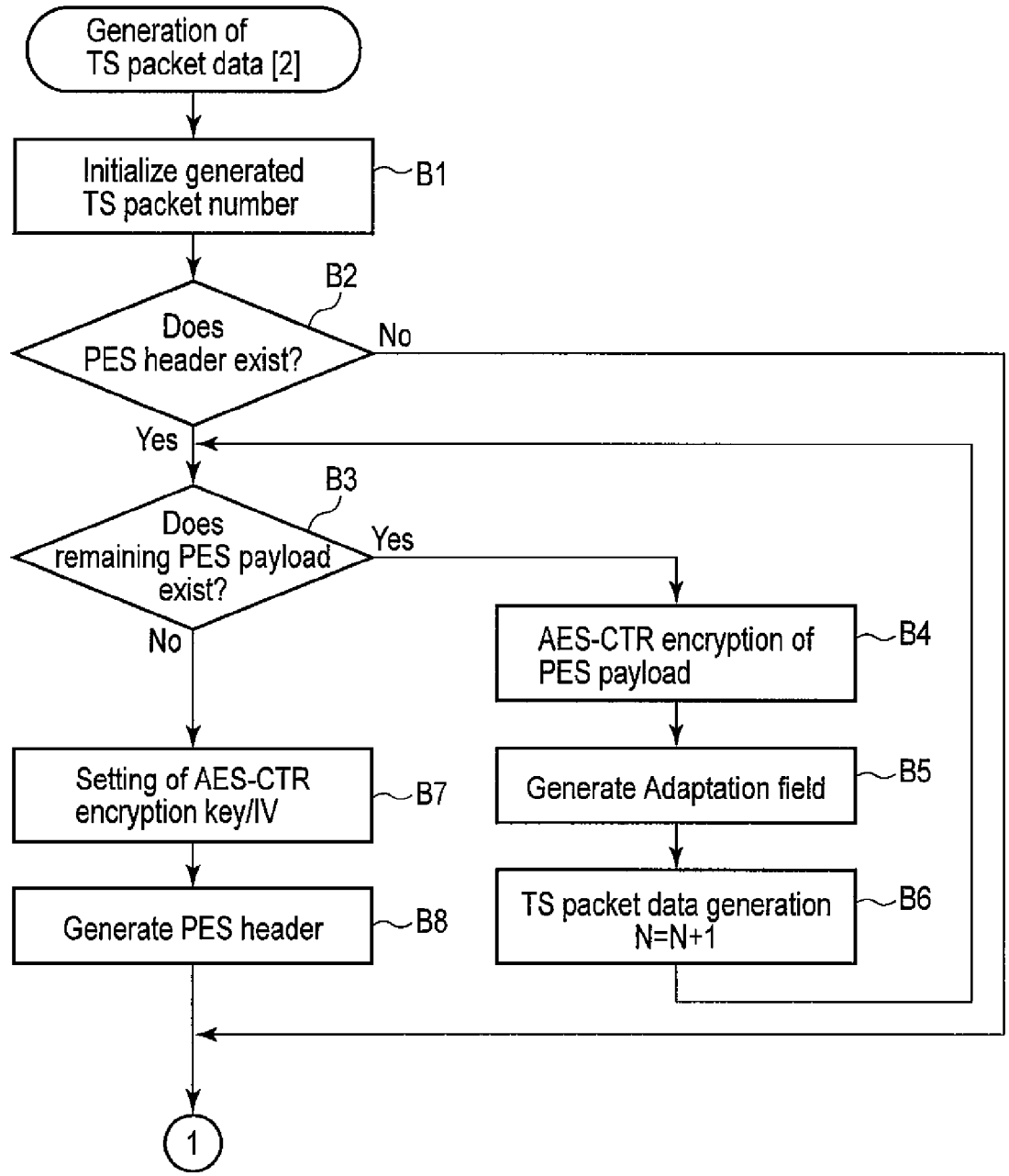
FIG. 13A is an exemplary first flowchart showing a procedure of encrypting a PES payload in the information processing apparatus of the embodiment.
Figure 13B:
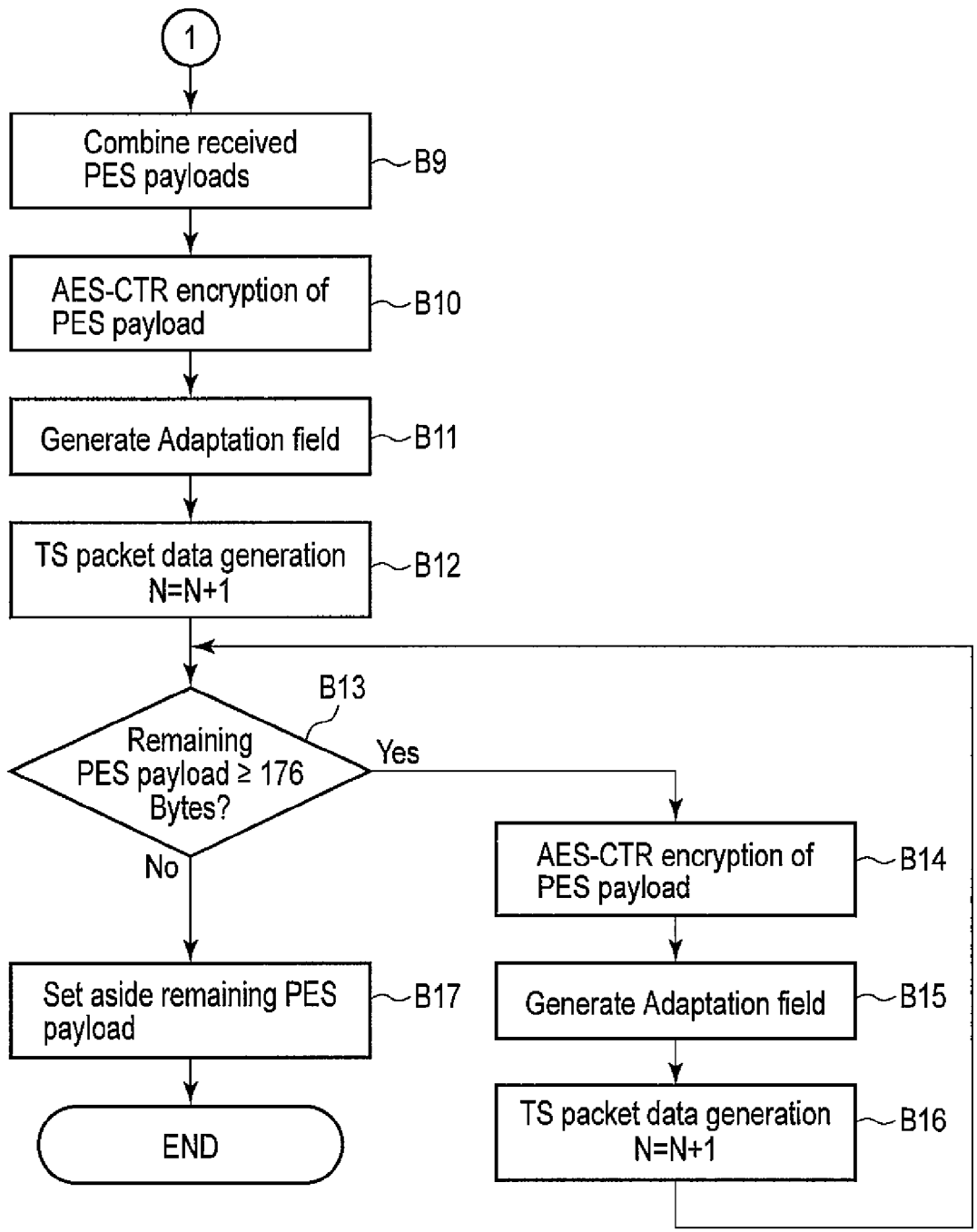
FIG. 13B is an exemplary second flowchart showing a procedure of encrypting a PES payload in the information processing apparatus of the embodiment.

FIG. 13A and FIG. 13B are exemplary flowcharts showing a procedure of encrypting a PES payload (that is performed in block A18 of FIG. 12B).

Regardless of whether or not the PES header exists, the decryption-TS packet generator 12 combines the remaining PES payload and the PES payload contained in the received packet (block B9), and AES-CTR-encrypts the remaining PES payload (block B10). Here, the decryption-TS packet generator 12 calculates the size of a to-be-encrypted PES payload as described below.

If the received packet contains Adaptation Field, the decryption-TS packet generator 12 subtracts, from 184 Bytes that are the total size of the TS payload and Adaptation Field, the size of Adaptation Field from which Stuffing Byte has been excluded (However, if Adaptation Field includes only Stuffing Byte, assume that Adaptation Field is not contained). If the received packet contains the PES header, the decryption-TS packet generator 12 subtracts, from 184 Bytes that are the total size of the TS payload and Adaptation Field, the size of the PES header. The decryption-TS packet generator 12 recognizes, as the size of the to-be-encrypted PES payload, a value that is smaller than the calculated size of the TS packet data and equal to a maximum multiple of 16 (which is the size of the AES-CTR encryption key).

Then, the decryption-TS packet generator 12 generates Adatptation Field into which Stuffing Byte has been inserted, in such a way that the total size of Adaptation Field, the PES header (only if the PES header is contained), and the encrypted PES payload becomes 184 Bytes (block B5). The decryption-TS packet generator 12 combines Adaptation Field, the PES header, and the encrypted PES payload to generate TS packet data (blocks B9 to B11), and adds 1 to the generated TS packet number N (block B12).

If the size of the remaining PES payload is greater than or equal to 176 Bytes (or is less than 184 Bytes and is a maximum multiple of 16 that is the size of the AES-CTR encryption key) (YES of block B13), the decryption-TS packet generator 12 AES-CTR-encrypts the top 176 Bytes of the PES payload (block B14). The decryption-TS packet generator 12 generates one TS packet data item by inserting Adaptation Field that is padded with 8 bytes of Stuffing Byte ahead of the encrypted PES payload, and adds 1 to the generated TS packet number N (blocks B15, B16). The decryption-TS packet generator 12 repeats a similar procedure until the remaining PES payload goes down below 176 Bytes to generate TS packet data, and adds 1 to the generated TS packet number N every time.

After the remaining PES payload goes down below 176 Bytes in size (NO of block B13), the decryption-TS packet generator 12 sets aside, as a remaining PES payload, a PES payload that has not been encrypted and is less than 176 Bytes (block B17).

The decryption-TS packet generator 12 inserts the TS header ahead of each of N TS packet data items that are generated by the above procedure, thereby generating as transmission packets to the other information processing apparatus 2. Here, the decryption-TS packet generator 12 sets values as described below into each field of the TS header in accordance with the MPEG2-TS format.

The PID of the TS header is set to ES PID. If the TS packet data contains the PES header, payload_unit_start_indicator of the TS header is set to 1. If the TS packet data contains the TS payload, continuity_counter of the TS header is increased by 1 for each TS packet. N is added to the transmission packet counter.

Incidentally, if the received packet is a null packet (NO of block A17 of FIG. 12B, and YES of A21), the decryption-TS packet generator 12 compares the value of the reception packet counter with the value of the transmission packet counter (block A24 of FIG. 12B). If the value of the transmission packet counter is less than the value of the reception packet counter (NO of block A24 of FIG. 12B), the decryption-TS packet generator 12 generates the received packet just as a transmission packet to the other information processing apparatus 2, and adds 1 to the transmission packet counter (blocks A22, A23 of FIG. 12B). If the value of the transmission packet counter is equal to or greater than the value of the reception packet counter (YES of block A24 of FIG. 12B), the decryption-TS packet generator 12 does not generate a transmission packet, thereby adjusting the difference between the size of the received content data and the size of content data to be transmitted, and does not change the value of the transmission packet counter.

Then, the content output module 13 sequentially transmits, to the other information processing apparatus 2, the transmission packets that are generated by the decryption-TS packet generator 12 as described above.

FIG. 13A and FIG. 13B show a processing flow for content data in the information processing apparatus 1 during a period of time from when a content data group encrypted by the first and second copyright protection method is received until when content data is encrypted by the third copyright protection method and transmitted. Each encryptor 106 manages a pair of the encryption key and the initial vector for each ES, and AES-CTR-encrypts the PES payload of each ES (blocks B4, B10, B14).

The information processing apparatus 1 includes the PID filters 102*a* and 102*b* that are provided for a plurality of transport streams having different frame formats; the encryptors 106 that manage pairs of the independent encryption keys and initial vectors for each PID, and encrypt PES payloads; and the TS packet generators 105. Therefore, the following is realized.

(a) When content whose copyright is protected by the first and second copyright protection method is transmitted by using the third copyright protection method, it is possible to eliminate a delay associated with the re-encoding of the content.

(b) When content whose copyright is protected by the first and second copyright protection method is transmitted by using the third copyright protection method, it is possible to transmit with no deterioration.

(c) Even if content whose copyright is protected by the first copyright protection method cannot be decoded by the information processing apparatus 1, the content may be decoded and viewed by the other information processing apparatus 2 to which the content is transmitted.

(d) By removing null packets that are equal in number to added packets, it is possible to prevent, as much as possible, the size of to-be-transmitted content from increasing.

In the above description, as shown in FIG. 4 and FIG. 5, what is described is an example in which both the first packet group of the first content and the second packet group of the second content are processed by one decryption-TS packet generator 12. As shown in FIG. 14, decryption-TS packet generators 12*a* and 12*b* may be, however, prepared for the first content and the second content, respectively.

Moreover, in the above description, what is described is an example in which both the third packet group associated with the first content and the third packet group of the second content are transmitted by one content output module 13 to the third transmission path. If the two decryption-TS packet generators 12*a* and 12*b* are, however, prepared as described above, as shown in FIG. 15, a session may be established on the third transmission path for each of the third packet groups of the first content and second content, and, under the control of an additionally-provided synchronization controller 14 (which includes a function equivalent to that of the synchronization controller 131 described above), the third packet groups may be transmitted by two content output modules 13*a* and 13*b* to the third transmission path. Even in this case, because data is transmitted on a single transmission path, one copyright protection method can be applied to both.

FIG. 16 shows the configuration of the decryption-TS packet generator 12*a* and 12*b* when the two decryption-TS packet generators 12*a* and 12*b* are prepared. In FIG. 16, "A" shows the configuration of the decryption-TS packet generator 12a into which the first packet group of the first content that is sent to the first transmission path by applying the first copyright protection method is input, and which generates the third packet group of the first content to be transmitted to the third transmission path by applying the third copyright protection method; "B" shows the configuration of the decryption-TS packet generator 12b into which the second packet group of the second content that is sent to the second transmission path by applying the second copyright protection method is input, and which generates the third packet group of the second content to be transmitted to the third transmission path by applying the third copyright protection method.

FIG. 17 shows an example of functional blocks associated with content playback process of the other information processing apparatus 2 that receives the third packet group output by the information processing apparatus 1.

Here, what is described is an example in which: audio data is generated through AAC decoding (d1); and video data that is obtained through MPEG-2 decoding (d2) and 2K-4K conversion (scaling process) (d3), and video data that is obtained through HEVC decoding (d4) are combined (d5) based on synchronization information contained in a header; and an 4K-UHDTV output is obtained.

The information processing apparatus 1 is designed to transmitted encrypted data without going through decoding, etc. such as those of d1, d2, d3, d4 and d5 of FIG. 17. Therefore, it is possible to reduce the amount to be processed, and avoid a delay associated with the processes and deterioration in the quality of content.

In this case, the premise is that the information processing apparatus 1 and the other information processing apparatus 2 exchange data through wireless communication that is compliant with the IEEE802.11 standard, for example. The quality of wireless-communication transmission paths might change. If the quality of transmission paths deteriorates, a control process may be performed in such a way as to generate the third packet group only from, for example, the first content, which is smaller in amount than when the third packet group is generated from the first content and the second content. Thus, for example, it is possible to avoid a situation where no video/audio is transmitted at all.

Furthermore, what is described is an example in which the information processing apparatus 1 transmits the third packet group to one third transmission path, and to another information processing apparatus 2. The information processing apparatus 1 may transmit, however, the third packet group to a plurality of third transmission paths, and to a plurality of other information processing apparatuses 2.

Incidentally, if the "receiving" (of the first content and the second content) is replaced with a "reading from an HDD or nonvolatile memory", the same advantageous effects can be obtained as a process for data temporarily stored in the nonvolatile memory, not as a reception signal process from outside.

The operation procedures of the present embodiment can be realized by software. Therefore, the software can be introduced into a normal computer through a computer-readable storage medium, and the same advantageous effects as those of the present embodiment therefore can be easily achieved.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a first receiver configured to receive a first packet group of first content to which a first copyright protection method is applied and which is output to a first transmission path, the first content comprising first image data for reproducing a first image of first resolution;
a second receiver configured to receive a second packet group of second content to which the first copyright protection method or a second copyright protection method is applied and which is output to a second transmission path, the second content comprising difference data between second image data and the first image data, the difference data being used for generating the second image data with the first image data, the second image data being used for reproducing the first image as a second image of second resolution higher than the first resolution;
a converting device configured to re-packetize the first content packetized into the first packet group received by the first receiver and the second content packetized into the second packet group received by the second receiver, into a third packet group for outputting to a transmission path by applying a third copyright protection method, wherein the converting device extracts a first PID (Packet Identification) from the first packet group and extracts a second PID from the second packet group, acquires first PAT (Program Association Table)/PMT (Program Map Table) from the first PID and acquires second PAT/PMT from the second PID, generates a third PMT for reproducing the second image based on the first PAT/PMT and the second PAT/PMT, and includes the generated third PMT in the third packet group; and
an output device configured to output the third packet group of the first content and the second content generated by the converting device to a third transmission path.

2. The apparatus of claim 1, wherein the output device is configured to output the third packet group to the third transmission path as an array in which packets or packet groups of the first content and the second content are alternately arranged chronologically based on time information of the first packet group and time information of the second packet group.

3. The apparatus of Claim 1, wherein the converting device is further configured to include the first PMT for reproducing the first image in the third packet group.

4. The apparatus of claim 1, wherein the converting device is configured to execute the re-packetization into the third packet group after removing a null packet in the first packet group and a null packet in the second packet group.

5. The apparatus of claim 1, wherein the output device is configured to output the third packet group of the first content using a first session established via the third transmission path, and to output the third packet group of the second content using a second session established via the third transmission path.

6. The apparatus of claim 1, wherein:
the third transmission path comprises a wireless transmission path of which transmission-path quality is variable; and
the converting device is configured to generate the third packet group per unit time from both the first packet group and the second packet group based on transmission-path quality of the third transmission path, or to generate the third packet group per unit time only from either the first packet group or the second packet group.

7. The apparatus of claim 1, wherein the third copyright protection method comprises HDCP (High-bandwidth Digital Content Protection) 2.0 or a succeeding standard thereof.

8. The apparatus of claim 1, wherein the converting device is configured to generate the third packet group so as to keep an amount to be transmitted per unit time at a constant level, by removing a null packet in the first packet group and a null packet in the second packet group, or by including a newly-created null packet in the third packet group.

9. The apparatus of claim 1, wherein the output device is configured to output the third packet group to each of a plurality of the third transmission paths.

10. A content transmission method of an information processing apparatus, the method comprising:
receiving a first packet group of first content to which a first copyright protection method is applied and which is output to a first transmission path, the first content comprising first image data for reproducing a first image of first resolution;
receiving a second packet group of second content to which the first copyright protection method or a second copyright protection method is applied and which is output to a second transmission path, the second content comprising difference data between second image data and the first image data, the difference data being used for generating the second image data with the first image data, the second image data being used for reproducing the first image as a second image of second resolution higher than the first resolution;
re-packetizing the first content packetized into the first packet group and the second content packetized into the second packet group, into a third packet group for outputting to a transmission path by applying a third copyright protection method, wherein the re-packetizing comprises extracting a first PID (Packet Identification) from the first packet group and extracting a second PID from the second packet group, acquiring first PAT (Program Association Table)/PMT (Program Map Table) from the first PID and acquiring second PAT/PMT from the second PID, generating a third PMT for reproducing the second image based on the first PAT/PMT and the second PAT/PMT, and including the generated third PMT in the third packet group; and
outputting the third packet group of the first content and the second content to a third transmission path.

11. A computer-readable, non-transitory storage medium having stored thereon a computer program which is executable by a computer, the computer program controlling the computer to function as:
a first receiver configured to receive a first packet group of first content to which a first copyright protection method is applied and which is output to a first transmission path, the first content comprising first image data for reproducing a first image of first resolution;
a second receiver configured to receive a second packet group of second content to which the first copyright protection method or a second copyright protection method is applied and which is output to a second transmission path, the second content comprising difference data between second image data and the first image data, the difference data being used for generating the second image data with the first image data, the second image data being used for reproducing the first image as a second image of second resolution higher than the first resolution;
a converting device configured to re-packetize the first content packetized into the first packet group received by the first receiver and the second content packetized into the second packet group received by the second receiver, into a third packet group for outputting to a transmission path by applying a third copyright protection method, wherein the converting device extracts a first PID (Packet Identification) from the first packet group and extracts a second PID from the second packet group, acquires first PAT (Program Association Table)/PMT (Program Map Table) from the first PID and acquires second PAT/PMT from the second PID, generates a third PMT for reproducing the second image based on the first PAT/PMT and the second PAT/PMT, and includes the generated third PMT in the third packet group; and
an output device configured to output the third packet group of the first content and the second content generated by the converter to a third transmission path.

* * * * *